US012715130B2

(12) United States Patent
Larsen et al.

(10) Patent No.: US 12,715,130 B2
(45) Date of Patent: Aug. 25, 2026

(54) CONTROL ROBOT FOR GROUND OPERATION BASED ON 3D MODEL

(71) Applicant: Canrig Robotic Technologies AS, Sandnes (NO)

(72) Inventors: Ørjan Helgaland Larsen, Sandnes (NO); Kenneth Mikalsen, Sandnes (NO)

(73) Assignee: Canrig Robotic Technologies AS, Sandnes (NO)

(*) Notice: Subject to any disclaimer, the term of this patent is extended or adjusted under 35 U.S.C. 154(b) by 97 days.

(21) Appl. No.: 18/607,101

(22) Filed: Mar. 15, 2024

(65) Prior Publication Data

US 2024/0316770 A1 Sep. 26, 2024

Related U.S. Application Data

(60) Provisional application No. 63/491,608, filed on Mar. 22, 2023.

(51) Int. Cl.
*B64F 5/40* (2017.01)
*B25J 9/16* (2006.01)
(Continued)

(52) U.S. Cl.
CPC ........... *B25J 9/1664* (2013.01); *B25J 11/008* (2013.01); *B25J 13/08* (2013.01)

(58) Field of Classification Search
CPC ........ B25J 9/1664; B25J 11/008; B25J 5/007; B25J 13/08; B64F 5/20; B64F 5/30; B64F 5/60
See application file for complete search history.

(56) References Cited

U.S. PATENT DOCUMENTS

| | | | |
|---|---|---|---|
| 2,872,698 | A | 2/1959 | Gommels |
| 3,079,871 | A | 3/1963 | Brodie |

(Continued)

FOREIGN PATENT DOCUMENTS

| | | | |
|---|---|---|---|
| CN | 111086002 | A | 5/2020 |
| CN | 115555352 | A | 1/2023 |

(Continued)

OTHER PUBLICATIONS

International Search Report and Written Opinion for PCT/NO2024/050066, mailed Sep. 30, 2024, 23 pages.

(Continued)

*Primary Examiner* — Dalena Tran
(74) *Attorney, Agent, or Firm* — Abel Schillinger, LLP

(57) ABSTRACT

A method that can include receiving a three-dimensional (3D) model of the vehicle at a control system, positioning the vehicle within a 3D ground operational space, manipulating a robotic arm to position a sensor at a predetermined distance from a reference location of the vehicle, measuring, via the sensor, a distance from the sensor to the reference location, determining a relative position of the reference location based on a known relative position of the sensor in the 3D ground operational space and the measured distance, establishing an orientation of the 3D model in a virtual 3D space based on the relative position of the reference location, and manipulating the robotic arm to perform a ground operation on the vehicle based on the position of the 3D model in the virtual 3D space.

20 Claims, 28 Drawing Sheets

(51) Int. Cl.
*B25J 11/00* (2006.01)
*B25J 13/08* (2006.01)

(56) References Cited

U.S. PATENT DOCUMENTS

| | | | |
|---|---|---|---|
| 4,365,928 | A | 12/1982 | Baily |
| 4,402,234 | A | 9/1983 | Malarz et al. |
| 4,499,784 | A | 2/1985 | Shum |
| 4,594,918 | A | 6/1986 | Kimura et al. |
| 4,627,786 | A | 12/1986 | Minematsu et al. |
| 4,642,021 | A | 2/1987 | Kikuchi |
| 4,657,472 | A | 4/1987 | Zimmer |
| 4,659,192 | A | 4/1987 | Chadwick et al. |
| 4,661,681 | A | 4/1987 | Bannister |
| 4,684,313 | A | 8/1987 | Minematsu et al. |
| 4,690,012 | A | 9/1987 | Dahlquist et al. |
| 4,695,701 | A | 9/1987 | Monteith et al. |
| 4,696,202 | A | 9/1987 | Jinriki et al. |
| 4,703,157 | A | 10/1987 | Dahlquist |
| 4,703,668 | A | 11/1987 | Peter |
| 4,708,580 | A | 11/1987 | Akeel |
| 4,723,713 | A | 2/1988 | Dahlquist |
| 4,731,886 | A | 3/1988 | Heinrich |
| 4,736,645 | A | 4/1988 | Zimmer |
| 4,771,652 | A | 9/1988 | Zimmer |
| 4,854,808 | A | 8/1989 | Bruno |
| 4,881,581 | A | 11/1989 | Hollerback |
| 4,990,050 | A | 2/1991 | Tsuge et al. |
| 5,115,531 | A | 5/1992 | Suzuki |
| 5,180,122 | A | 1/1993 | Christian et al. |
| 5,189,836 | A | 3/1993 | Alder |
| 5,318,254 | A | 6/1994 | Shaw et al. |
| 5,490,646 | A | 2/1996 | Shaw et al. |
| 5,720,069 | A | 2/1998 | Wanner et al. |
| 5,735,627 | A | 4/1998 | Nagao et al. |
| 5,738,160 | A | 4/1998 | Rice |
| 5,816,108 | A | 10/1998 | Obata et al. |
| 5,833,762 | A | 11/1998 | Wanner et al. |
| 5,858,111 | A | 1/1999 | Marrero |
| 6,014,909 | A | 1/2000 | Fiora |
| 6,030,025 | A | 2/2000 | Kanerva |
| 6,389,921 | B1 | 5/2002 | Nada |
| 6,415,678 | B1 | 7/2002 | Nada |
| 6,477,730 | B1 | 11/2002 | Marrero |
| 6,539,678 | B1 | 4/2003 | Campbell |
| 6,626,195 | B1 | 9/2003 | German |
| 7,797,796 | B2 | 9/2010 | Migli |
| 7,870,807 | B2 | 1/2011 | Hezel et al. |
| 9,316,013 | B1 | 4/2016 | Kraft |
| 9,657,589 | B2 | 5/2017 | Hjerpe |
| 10,814,480 | B2 | 10/2020 | Georgeson et al. |
| 10,974,396 | B2 | 4/2021 | Bartlett et al. |
| 11,213,955 | B2 | 1/2022 | Nelson et al. |
| 11,466,504 | B2 | 10/2022 | Reiter |
| 11,623,823 | B1 | 4/2023 | Hoshino |
| 2002/0108635 | A1 | 8/2002 | Marrero |
| 2003/0010148 | A1 | 1/2003 | Okamoto et al. |
| 2003/0089183 | A1 | 5/2003 | Jacobsen et al. |
| 2006/0243087 | A1 | 11/2006 | Krogedal |
| 2008/0011116 | A1 | 1/2008 | Hezel et al. |
| 2008/0223170 | A1 | 9/2008 | Tealdi et al. |
| 2010/0147331 | A1 | 6/2010 | Coppola |
| 2011/0106302 | A1 | 5/2011 | Long |
| 2011/0257786 | A1 | 10/2011 | Caron L'Ecuyer et al. |
| 2012/0160163 | A1 | 6/2012 | Long |
| 2013/0000200 | A1 | 1/2013 | Reus |
| 2013/0226341 | A1 | 8/2013 | Sturm |
| 2014/0076089 | A1 | 3/2014 | Long |
| 2014/0116182 | A1 | 5/2014 | Long |
| 2014/0258497 | A1 | 9/2014 | Kiyomasa |
| 2015/0158601 | A1 | 6/2015 | Topf et al. |
| 2015/0298826 | A1 | 10/2015 | Luca |
| 2015/0375390 | A1 | 12/2015 | Becroft et al. |
| 2016/0008989 | A1 | 1/2016 | Bakir et al. |
| 2017/0203441 | A1 | 7/2017 | Nelson et al. |
| 2017/0205022 | A1 | 7/2017 | Trui et al. |
| 2017/0312923 | A1 | 11/2017 | Erickson |
| 2017/0356506 | A1 | 12/2017 | Takada |
| 2018/0126564 | A1 | 5/2018 | Chisena |
| 2018/0243927 | A1 | 8/2018 | Dufau |
| 2019/0160672 | A1* | 5/2019 | Yamamoto ............. B25J 9/1664 |
| 2019/0160682 | A1* | 5/2019 | Sato ......................... B25J 9/162 |
| 2020/0009722 | A1 | 1/2020 | Yamashiro |
| 2020/0254494 | A1 | 8/2020 | Bolton et al. |
| 2020/0324405 | A1 | 10/2020 | Berwers et al. |
| 2020/0353511 | A1 | 11/2020 | Larsson et al. |
| 2020/0368911 | A1* | 11/2020 | Takeuchi ............... B25J 9/1694 |
| 2021/0016412 | A1 | 1/2021 | Nakayama et al. |
| 2021/0190207 | A1 | 6/2021 | Bartlett et al. |
| 2021/0229293 | A1* | 7/2021 | Amacker ............... B25J 11/008 |
| 2021/0292142 | A1 | 9/2021 | Elliot et al. |
| 2022/0250245 | A1 | 8/2022 | Panigrahi et al. |
| 2023/0052365 | A1 | 2/2023 | Vargo et al. |

FOREIGN PATENT DOCUMENTS

| | | | |
|---|---|---|---|
| DE | 202010002591 | U1 | 10/2011 |
| DE | 202020003208 | U1 | 8/2020 |
| EP | 537339 | B1 | 8/1996 |
| EP | 711236 | B1 | 3/1997 |
| EP | 776264 | A1 | 6/1997 |
| EP | 1334775 | B1 | 4/2005 |
| EP | 1632320 | B1 | 10/2007 |
| EP | 1932630 | A1 | 6/2008 |
| EP | 3301029 | A1 | 4/2018 |
| EP | 3415285 | A2 | 12/2018 |
| EP | 3575530 | A1 | 12/2019 |
| WO | 9506587 | A1 | 3/1995 |
| WO | 9636461 | A1 | 11/1996 |
| WO | 2008110899 | A2 | 9/2008 |
| WO | 2022190012 | A1 | 9/2022 |

OTHER PUBLICATIONS

Partial International Search Report and Provisional Written Opinion for PCT/NO2024/050066, mailed Jun. 28, 2024, 10 pages.

* cited by examiner

CROSS-SECTIONAL VIEW ALONG LINE 14-14

CROSS-SECTIONAL VIEW ALONG LINE 14-14

CROSS-SECTIONAL VIEW ALONG LINE 14-14

CROSS-SECTIONAL VIEW ALONG LINE 14-14

CROSS-SECTIONAL VIEW ALONG LINE 14-14

CONTROL ROBOT FOR GROUND OPERATION BASED ON 3D MODEL

CROSS-REFERENCE TO RELATED APPLICATION(S)

This application claims priority under 35 U.S.C. § 119(c) to U.S. Provisional Application No. 63/491,608, entitled "CONTROL ROBOT FOR GROUND OPERATION BASED ON 3D MODEL," by Ørjan Helgaland LARSEN et al., filed Mar. 22, 2023, which is assigned to the current assignee hereof and incorporated herein by reference in its entirety.

FIELD OF THE DISCLOSURE

The present invention relates, in general, to the field of performing ground operations on vehicles, such as aircraft, 18-wheelers, boats, commercial busses, etc. More particularly, present embodiments relate to a system and method for manipulating tools during ground operations on a vehicle.

BACKGROUND

Vehicles, such as aircraft, may require ground maintenance to maintain desired operational efficiencies (such as washing the body and engines) as well as support safe operation during travel (such as de-icing and inspections during ground operations before the travel). These ground operations can burden or delay an already tight turn-around schedule to ready the large equipment for the next travel operation (such as next flight, voyage, or trip). In a particular example, at most airports, ground operations for de-icing, inspecting, washing, engine washing, etc. are performed by a manually operated spray nozzle or manned equipment that is transported along a tarmac to access the zones of the aircraft to which the operations are to be performed. The ground operations can help to maintain these vehicles, and by reducing out-of-service hours for these vehicles, they can support longer in-service periods. Therefore, improvements in ground maintenance systems for vehicles are continually needed.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for performing a ground operation on a vehicle. The system also includes a robotic arm; one or more sensors coupled to the robotic arm; and a control system configured to: receive a three-dimensional (3D) model of a vehicle; manipulate the robotic arm to position the one or more sensors within a predetermined distance from a respective one of one or more reference locations of the vehicle, where the vehicle is positioned within a 3D ground operational space; measure, via the one or more sensors, a distance from the one or more sensors to each of one or more reference locations; determine a relative position of each of the one or more reference locations in the 3D ground operational space based on a known relative position of each of the one or more sensors in the 3D ground operational space and the respective measured distances; and establish an orientation of the 3D model based on the relative position of each of the one or more reference locations in the 3D ground operational space. Other embodiments of this aspect include corresponding computer systems, apparatus, and computer programs recorded on one or more computer storage devices, each configured to perform the actions of the methods.

One general aspect includes a method for performing a ground operation on a vehicle. The method also includes receiving a three-dimensional (3D) model of the vehicle at a control system, where the vehicle is positioned within a 3D ground operational space; manipulating a robotic arm to position a sensor within a predetermined distance from a reference location of the vehicle; measuring, via the sensor, a distance from the sensor to the reference location; determining a relative position of the reference location based on a known relative position of the sensor in the 3D ground operational space and the measured distance; and establishing an orientation of the 3D model in a virtual 3D space based on the relative position of the reference location. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", "generally", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

As used herein, "vehicle" refers to a conveyance used to convey cargo or passengers from one location to another. Therefore, in this disclosure, "vehicle" is synonymous with "aircraft," "airplane," "plane," "jet," "space vehicle," "boat," "ship," "bus," "truck," "18-wheeler transport," "train car," "trolley car," or "car."

The following discussion is focused on performing ground operations on an aircraft 40, but it should be understood that these principles in this disclosure can equally apply to performing ground operations on other types of vehicles such as boats, ships, busses, trucks, train cars, trolley cars, or cars. Therefore, even though the description below specifically calls out aircraft 40 in reference to the figures, one or ordinary skill in the art would understand how to apply these disclosed principles to the other vehicles mentioned above.

Figure 1:
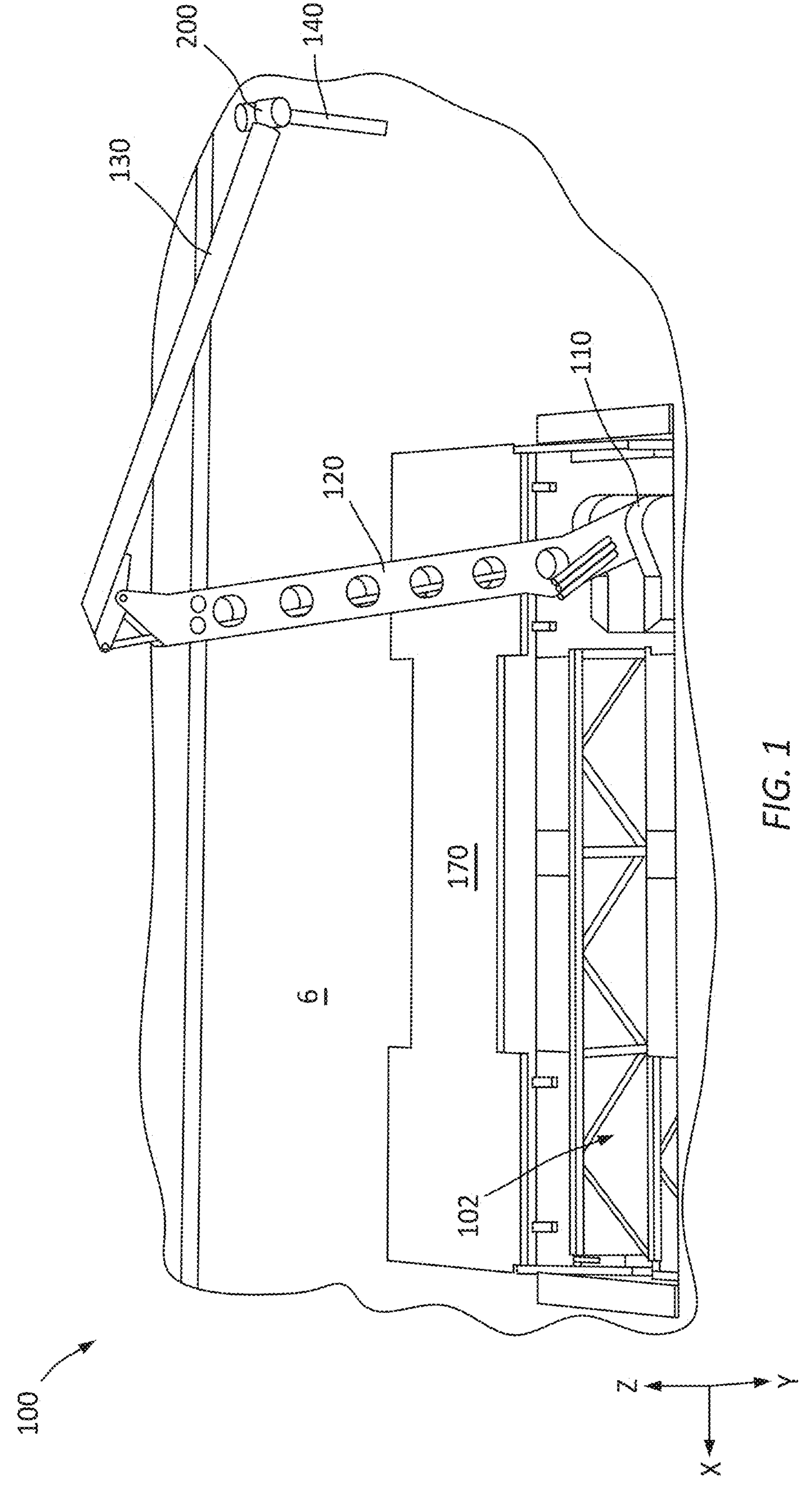
FIG. 1 is a representative perspective view of a robotic arm system for manipulating a tool to perform a ground operation on a vehicle or large conveyance, in accordance with certain embodiments.

FIG. 1 is a representative perspective view of a robotic arm 100 for manipulating a tool 140 to perform a ground operation on a vehicle or large conveyance, in accordance with certain embodiments. The vehicle can be transported to a desired location near the robotic arm 100. It is preferable that the robotic arm 100 remain in a stowed position with the robotic arm 100 stored in a cavity 102 under a cover 170 while the vehicle is transported to the desired location. Once the vehicle is at the desired location, the cover 170 can be moved away from the cavity 102 to allow the robotic arm 100 to extend into a deployed position, such as the position shown in FIG. 1. The robotic arm 100 can include a base 110 that can be coupled to a support structure in the cavity 102. A lower segment 120 can be rotationally coupled to the base 110 at one end and rotationally coupled to an upper segment 130 at an opposite end. The upper segment 130 can be rotationally coupled to the lower segment 120 at one end and rotationally coupled to one end of a wrist joint 200 at an opposite end of the upper segment, with a tool 140 coupled to an opposite end of the wrist joint 200 from the upper segment 130.

As used herein, a "horizontal orientation" or "horizontal position" refers to a horizontal plane that is generally parallel to a horizontal plane of the cover 170 when the cover is in a closed position over the cavity 102 (e.g., X-Y plane shown in FIG. 1), where the horizontal plane can be any plane that is within a range of "0" degrees+/−10 degrees from the horizontal plane of the cover 170 when the cover is in a closed position. As used herein, a "vertical orientation" or "vertical position" refers to a vertical direction (e.g., Z direction shown in FIG. 1) that is generally perpendicular to the horizontal plane of the cover 170 when the cover is in a closed position, where the vertical direction can be any direction that is within a range of 90 degrees+/−10 degrees from the horizontal plane of the cover 170 when the cover is in a closed position. If the cover is not used in an embodiment, then the horizontal plane is the surface on which the vehicle 40 is positioned to perform ground operations.

Figure 2:
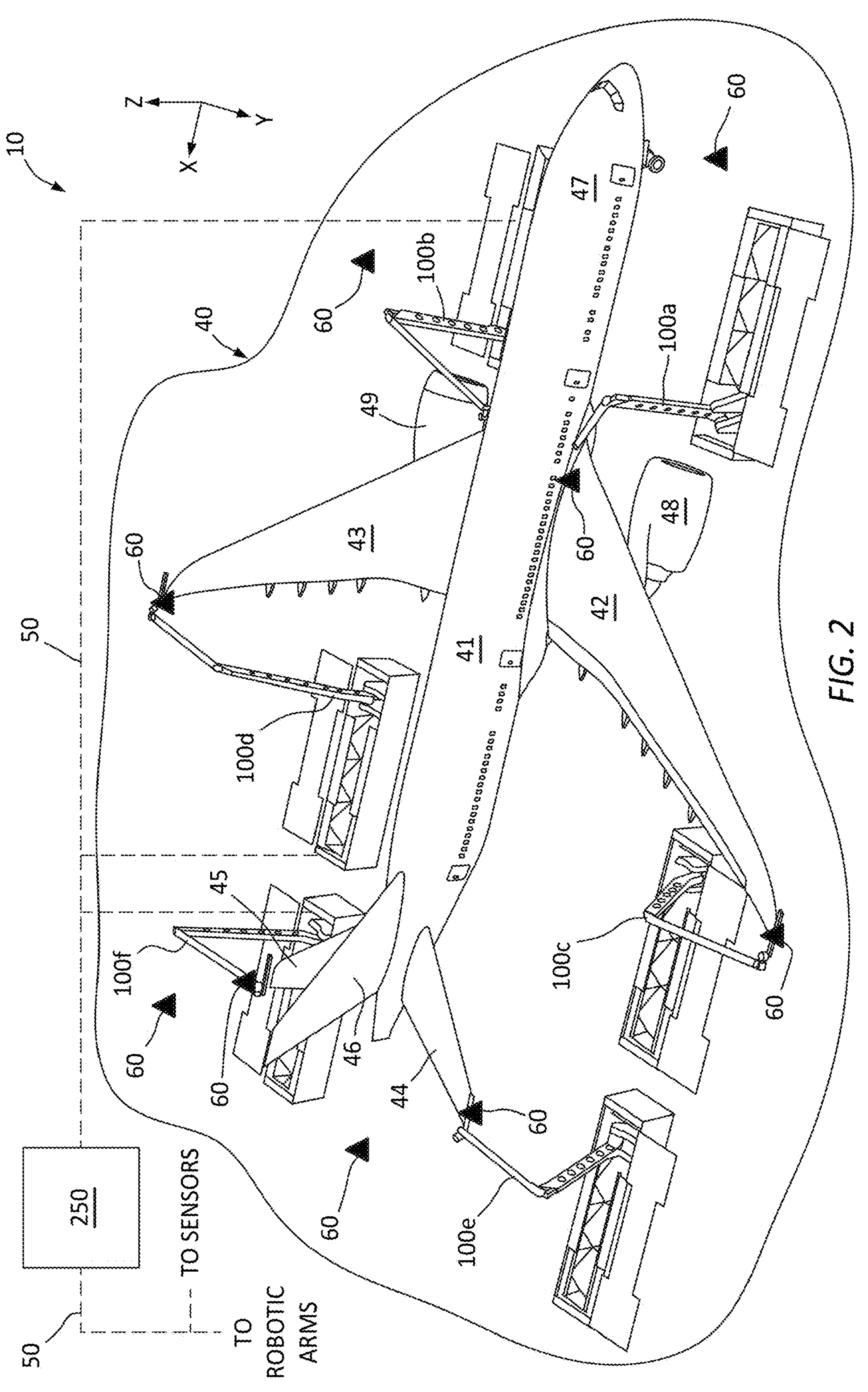
FIG. 2 is a representative perspective view of a system of robotic arms for performing a ground operation on an aircraft on a tarmac, in accordance with certain embodiments.

FIG. 2 is a representative perspective view of a system 10 of robotic arms 100*a-f* for performing a ground operation on an aircraft 40 on a surface 6 (e.g., a tarmac), in accordance with certain embodiments. In a certain embodiment, one or more robotic arms 100 can be installed below the surface 6 (e.g., tarmac at an airport, floor in a hanger, etc.) at desired locations to facilitate performing particular ground operations on an aircraft 40. For example, the robotic arms 100*a-f* in FIG. 2 can be deployed to wash an outer surface of the aircraft 40, with each of the robotic arms 100*a-f* being controlled to wash at least a portion of the aircraft body. It should be understood that these robotic arms 100*a-f* can cooperate with each other to perform any other ground operation such as inspecting, washing, engine washing, etc.

A controller 250 can provide control of the robotic arms 100*a-f* to perform the ground operation via wired or wireless network 50, which can provide a communication link between the controller, operator workstations, the robotic arms 100*a-f*, a vehicle controller (e.g., cockpit controller for an aircraft 40), and any other equipment used to facilitate the ground operation. The controller 250 can communicate with an operator of the aircraft 40 (e.g., pilot, ground crew, etc.) to coordinate when the aircraft 40 is moved into position for the ground operation. The operator can operate the aircraft 40 to move into position, or a tug vehicle can be controlled by the operator to maneuver aircraft 40 into position. Additionally, or alternatively, a docking system can be used to navigate the aircraft 40 into a desired position for performing the ground operation. This docking system can communicate with the controller 250 to indicate that the aircraft 40 is in the desired position. The controller 250 can then deploy the robotic arms 100*a-f* from their respective cavities 102 to perform the ground operation on the body of the aircraft 40. The aircraft 40 shown in FIG. 2 is representative of a large body aircraft, such as a Boeing 777 or similar sized aircraft.

The robotic arms 100*a-f* can be used to perform the ground operation on the body of the aircraft 40, which can include exterior surfaces of the fuselage 41, the right and left wings 42, 43, the right and left horizontal stabilizers 44, 45, the vertical stabilizer 46, the cockpit area 47, and the right and left engines 48, 49. The operation including the engines 48, 49 can include spraying treatment fluid into an internal space of the engines 48, 49, but the surfaces being operated on by the tools 140 can still be seen as being external surfaces, since they are accessible by the tool 140 (e.g., via spray from nozzles, via remote sensing for inspections, etc.).

When the robotic arms 100*a-f* are deployed, they can be controlled to move along the surfaces of the aircraft 40 to perform the ground operation. However, the position of the aircraft 40 may change each time an aircraft 40 is positioned for the ground operation, the type of aircraft 40 may change from operation to operation (which can change the shape and position of the surfaces on the aircraft 40), or the position of the aircraft 40 (or at least portions of the aircraft 40) can be different for various reasons, such as due to uneven tire inflation, different levels of fuel in fuel storage tanks, damaged portions of the aircraft 40, chassis upgrades to the aircraft 40, etc.

To allow for these variations in the aircraft 40 and the aircraft 40 position, the controller 250 can use sensors 60 to determine an actual position of the aircraft 40 (or at least a portion of the aircraft 40) relative to the positions of the sensors 60, and thereby determine the positions of the robotic arms 100*a-f* relative to the aircraft 40, then the controller 250 can know where the surfaces of the aircraft 40 are in the three-dimensional (3D) ground operation space in which the robotic arms 100*a-f* operate, and the controller 250 can manage the manipulations of the robotic arms 100*a-f* in the 3D ground operation space to perform the ground operation on the aircraft 40 based on a 3D model of the aircraft 40.

A database, communicatively coupled to the controller 250, can store 3D models for various aircraft that can be serviced by the robotic arms 100*a-f* to perform the ground operation(s). The tail number of the aircraft 40 (or vehicle identification number of the vehicle) can be communicated to the controller 250 visually, from a docking system, a cockpit controller, a pilot, an operator, the internet, or any other data source. The controller 250 can receive the tail number (or VIN number) and determine which of the models in the 3D model database is to be loaded into the virtual 3D space for controlling ground operations for the aircraft 40 (or other vehicle). The controller 250 can operate one or more of the robotic arms 100*a-f* to detect a distance from one or more reference points on the aircraft 40 and determine a relative position of the aircraft 40 relative to the robotic arms 100*a-f*, and thereby determine a relative position of the aircraft 40 within the 3D ground operation space. An operator (e.g., a pilot) can confirm the tail number (or VIN number) as well as the ground operation to be performed. The controller 250 can then use the 3D model in the virtual 3D space to control operation of the robotic arms 100*a-f* in the 3D ground operation space for performing the ground operation on the aircraft 40.

The sensors 60 can be positioned at any desired location around (e.g., above, below, right side, left side, front, rear, etc.) the aircraft 40 to establish the position of the aircraft 40 within the 3D ground operation space, and thereby establish the position of the aircraft 40 surfaces within the 3D ground operation space based on the 3D model. One or more sensors 60 can be positioned on one or more of the robotic arms 100*a-f*. The sensors 60 can be in communication with the controller 250 via the wired or wireless network 50. Sensors 60 can also be used to help operators determine if the ground operation was performed satisfactorily on each zone of the aircraft 40 and determine if the ground operation was successful or if additional treatment is needed to complete the ground operation successfully. The sensors 60 used for determining relative distances to the aircraft 40 can include LiDAR sensors, Radar sensors, laser sensors, acoustic sensors, ranging sensors, cameras, or other sensors that can measure distances from surfaces of the aircraft 40 to the sensors 60. The sensors 60 used for determining whether or not the ground operation was performed or is being performed satisfactorily can be imaging sensors (such as cameras), infrared sensors, radar sensors, etc.

Figure 3:
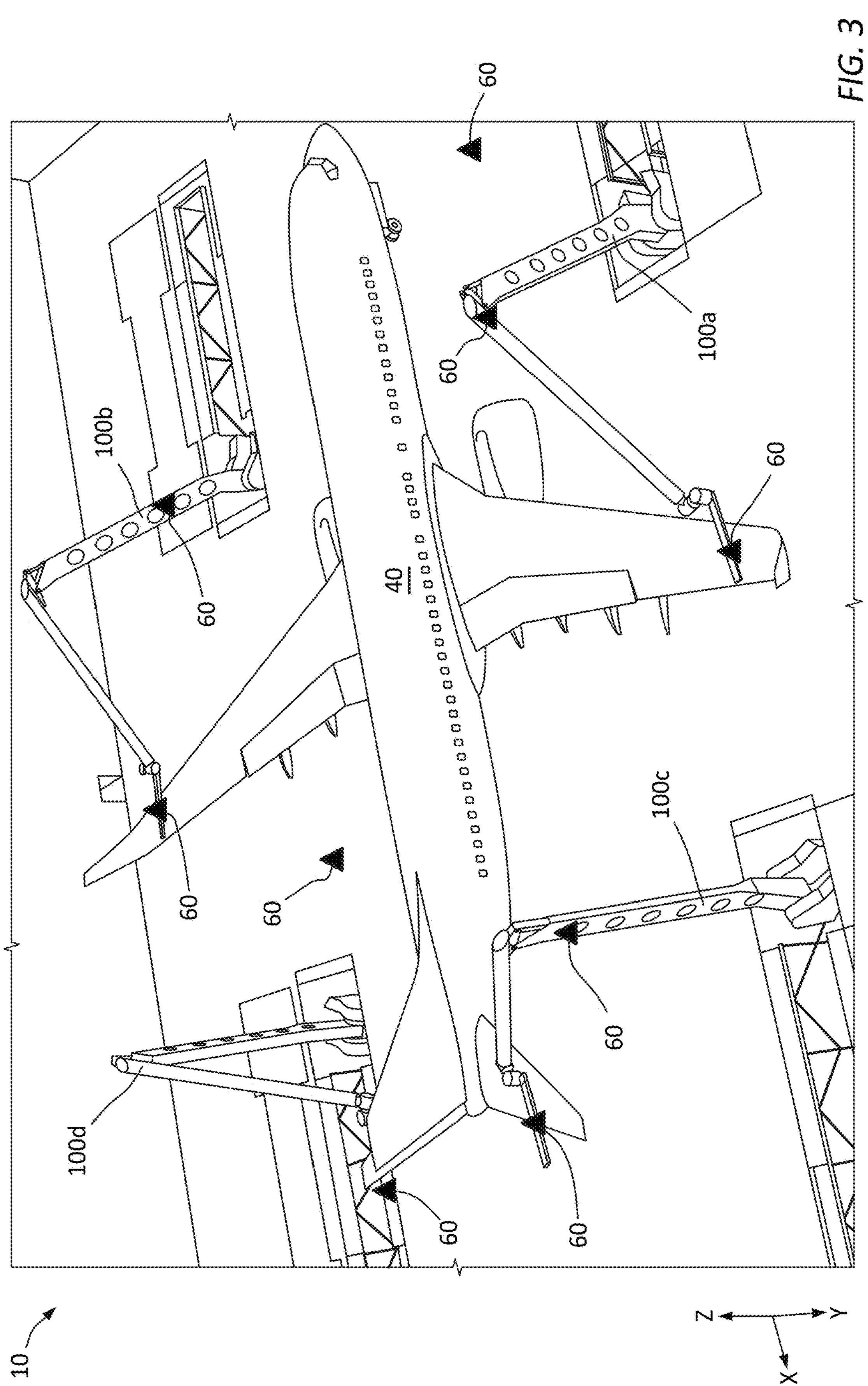
FIG. 3 is a representative perspective view of a system of robotic arms for performing a ground operation on an aircraft on a tarmac and inside a shelter, in accordance with certain embodiments.

FIG. 3 is a representative perspective view of a system of robotic arms 100*a-d* for performing a ground operation on an aircraft 40 that is positioned on a tarmac or inside a shelter, in accordance with certain embodiments. In this non-limiting embodiment, fewer robotic arms 100*a-d* can be deployed by the controller 250 to perform ground operations on an aircraft 40 that can be smaller than the one illustrated in FIG. 2. FIG. 3 also shows the aircraft 40 positioned inside a hanger for receiving the ground operation via the robotic arms 100*a-d*, which can be beneficial during some ground operations, such as inspections, etc. The tools 140 can be controlled to move along a surface of the aircraft 40 while maintaining a gap between the tool 140 and the surface, as can be seen in FIG. 3. The desired gap between the tool 140 and a surface of the aircraft 40 can vary as tools are changed and different ground operations are performed. For example, and inspection tool 140*b* may need to be held closer to the surface while a washer tool 140*d* or a de-icing tool 140*a* may be positioned farther away from the surface, or vice versa.

Figure 4:
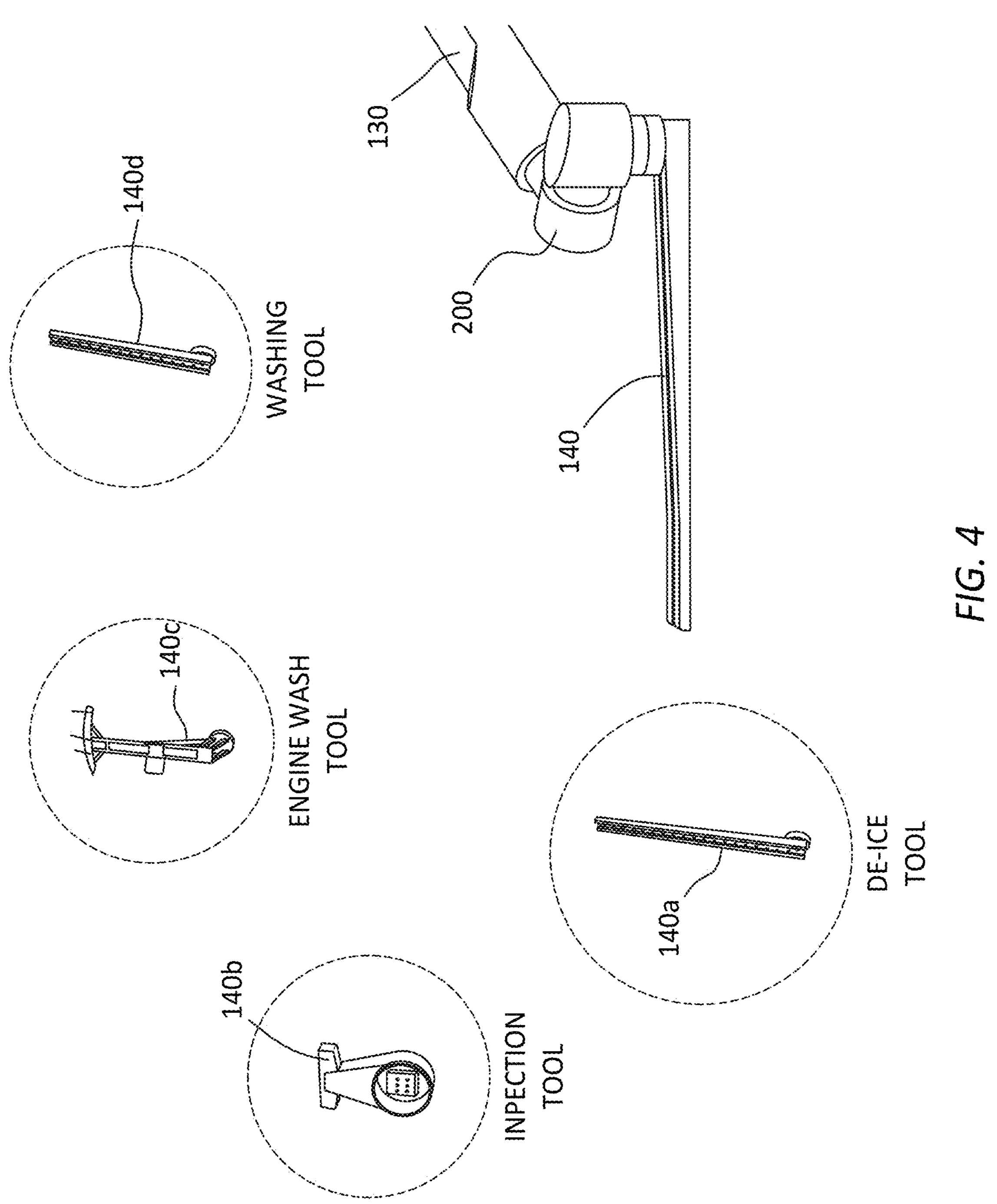
FIG. 4 is a representative perspective view of an end of a robotic arm to which an end effector or tool can be coupled, with multiple tool examples illustrated, in accordance with certain embodiments.

FIG. 4 is a representative perspective view of an end of a robotic arm 100 to which an end effector or tool 140 can be coupled, with multiple tool examples illustrated, in accordance with certain embodiments. The wrist joint 200 can be coupled to different tools 140 to facilitate various ground operations, such as washing (e.g., tools 140*c*, 140*d*), de-icing (e.g., tool 140*a*), and performing inspections (e.g., tool 140*b*) during ground operations. These tools can be manually or automatically coupled to the wrist joint 200.

Figure 5:
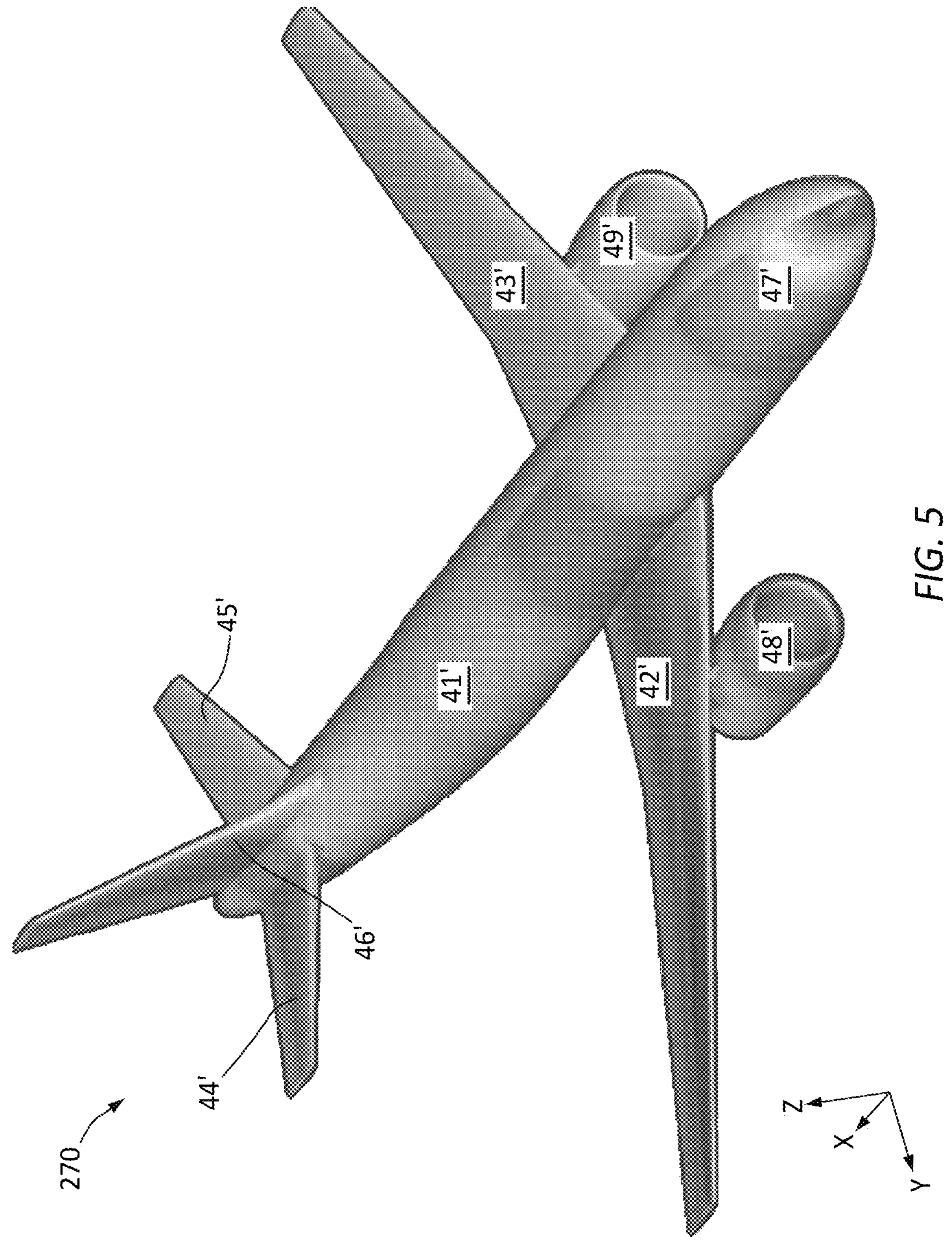
FIG. 5 is a representative perspective view of a three-dimensional (3D) model of an aircraft that can be received at a control system for controlling operation of one or more robotic arms, in accordance with certain embodiments.

FIG. 5 is a representative perspective view of a three-dimensional (3D) model 270 of an aircraft 40 that can be received at a control system 260 (see FIG. 13) for controlling operation of one or more robotic arms 100, in accordance with certain embodiments. If a ground operation (e.g., washing, de-icing, etc.) is to be performed on an aircraft 40, the aircraft 40 can be moved to a desired location proximate the one or more robotic arms 100 and a 3D model 270, that is representative of the aircraft 40, can be received at the control system 260 by the controller 250. The controller can locate the 3D model in a virtual 3D space that can also include 3D models of the one or more robotic arms 100, the 3D model 270, and relative positioning of the one or more sensors 60. The controller 250 can use the 3D model to control placement and manipulation of tools 140 about the body of the aircraft 40 by controlling the one or more robotic arms 100 based on the 3D model 270 positioned in the virtual 3D space.

In a non-limiting embodiment, the 3D model 270 can be created by the control system 260, by either stationary or moveable sensors 60 that can scan the vehicle 40 in real-time and the control system 260 can build the 3D model 270 in real-time. If the stationary or moveable sensors 60 scan the vehicle 40 after it has been parked in the 3D ground operation space, then adjustments to the 3D model 270 may not be necessary to correct for location, orientation, or deformation since the 3D model 270 would have been built with the vehicle 40 was in-place for ground operations. Whether the 3D model 270 is generated by the control system 260 on-site or at a remote location from the 3D ground operation space, or provided to the control system 260 by a third party, the control system can store the 3D model in the database 256 (see FIG. 13) and use the 3D model 270 to control operation of the robotic arms 100 to perform the ground operation on the vehicle 40. The sensors 60 can also be used to sense the location, orientation, or location of the vehicle 40 and its components dynamically and in real-time and the control system 260 can make adjustments to the robotic arm control in real-time.

The virtual position of the 3D model 270 within the virtual 3D space may need to be calibrated to substantially represent an actual position of the aircraft 40 relative to the one or more robotic arms 100. When the 3D model 270 is positioned appropriately in the virtual 3D space, then the controller 250 can control the actual robotic arms 100 based on the virtual 3D model 270 without having to continuously detect the aircraft surfaces and control the one or more robotic arms 100 based on real-time measurements. It is intended that measurements of a finite number of portions of the aircraft surfaces can be collected at the beginning of the process to perform a ground operation on the aircraft 40, and once the 3D model 270 is substantially calibrated to the actual position of the aircraft 40 in an actual 3D ground operation space, the ground operation can be completed without further measurements or recalibrations.

However, recalibrations may be needed, in the event that the aircraft 40 is moved before the ground operation is complete (e.g., via high-winds, earthquakes, operator initiated termination, ground equipment malfunction, or any other reason that may interrupt the ground operation). In this case, the beginning procedure to adjust the position of the 3D model 270 to calibrate its position in the virtual 3D space can be run again to reestablish the calibrated virtual 3D space, and the ground operation can then continue from the beginning or from the place in the process where the ground operation was halted.

In a non-limiting embodiment, the 3D model of the vehicle (in this example, an aircraft 40) can include all parts that represent those actual counterparts of the aircraft 40. For example, the actual fuselage 41 can be represented in the 3D model by the virtual fuselage 41'. The actual right wing 42 can be represented in the 3D model by the virtual right wing 42'. The actual left wing 43 can be represented in the 3D model by the virtual left wing 43'. The actual right horizontal stabilizer 44 can be represented in the 3D model by the virtual right horizontal stabilizer 44'. The actual left horizontal stabilizer 45 can be represented in the 3D model by the virtual left horizontal stabilizer 45'. The actual vertical stabilizer 46 can be represented in the 3D model by the virtual vertical stabilizer 46'. The actual cockpit area 47 can be represented in the 3D model by the virtual cockpit area 47'. The actual right engine 48 can be represented in the 3D model by the virtual right engine 48'. The actual left engine 49 can be represented in the 3D model by the virtual left engine 49'. The 3D model can include all the internal components of the aircraft as well as the external ones, but the 3D model can also be configured as a mere shell that includes all of the surfaces on which ground operations are performed, without anything else. This latter configuration can minimize storage requirements for the control system 260 and minimize processing delays that can be caused by the complexity of a full 3D model.

It should be noted that the 3D model 270 shown in FIG. 5 is representative of an aircraft 40, but it is not intended to indicate a 3D model of the aircraft 40 in the previous figures. The 3D model for the aircraft 40 on which the ground operation is being performed can represent the surfaces on which any ground operations are to be performed. This 3D model 270 in FIG. 5 merely illustrates a 3D model 270 that can be received at the control system 260 by the controller 250 to control manipulation of the robotic arms 100.

Figures 6A, 6B:
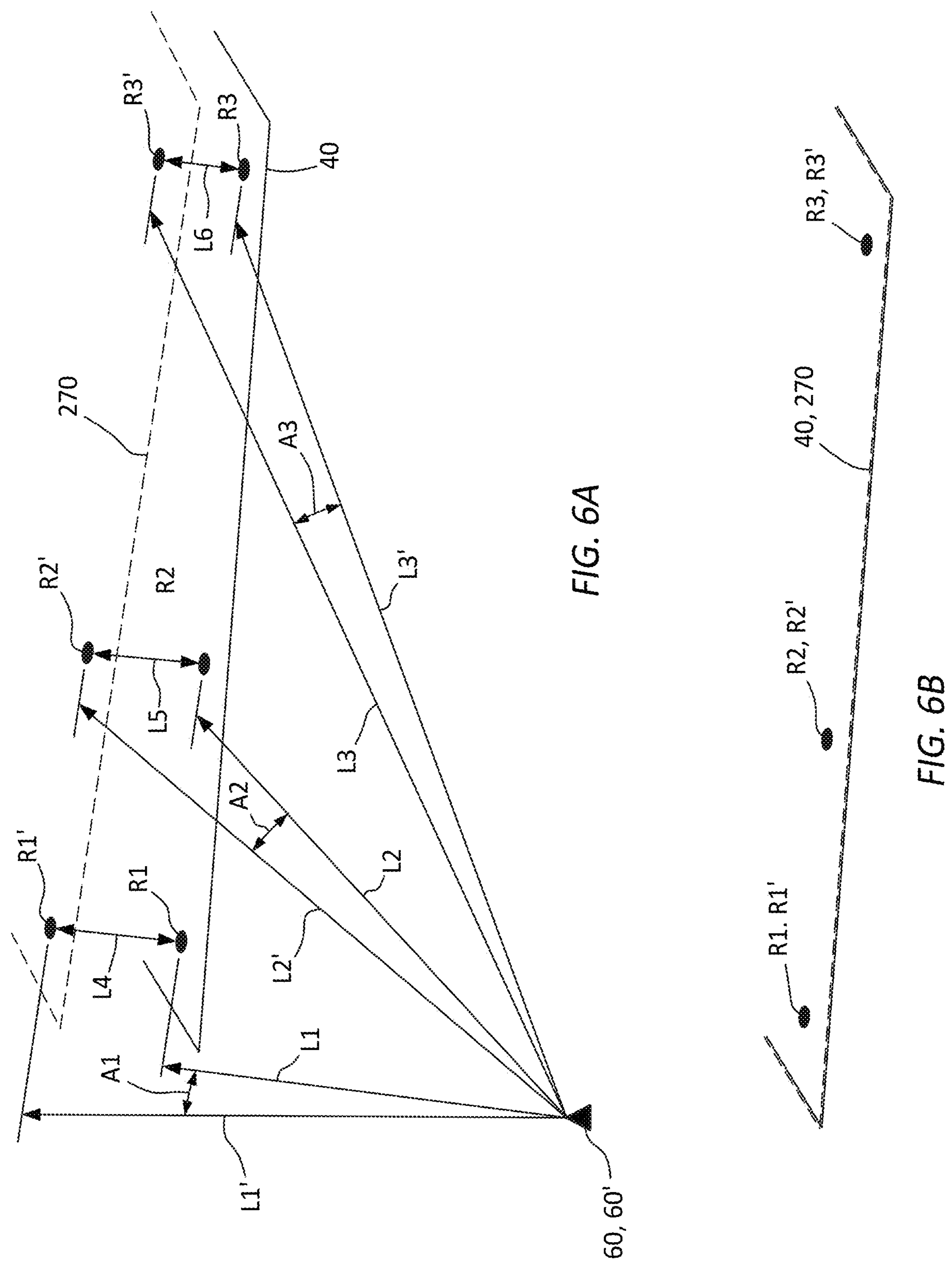
FIG. 6A is a representative functional diagram of a sensor for measuring distances that can be used to align a 3D model of an aircraft in a control system with an actual aircraft the 3D model represents, in accordance with certain embodiments.
FIG. 6B is a representative view of a 3D model of an aircraft in a control system that has been aligned with an actual aircraft the 3D model represents, in accordance with certain embodiments.

FIG. 6A is a representative functional diagram of a sensor 60 for measuring distances that can be used to align (or calibrate) a 3D model 270 in a virtual 3D space in a control system with an actual aircraft 40, which the 3D model represents, in accordance with certain embodiments. FIG. 6B is a representative view of the 3D model 270 shown in FIG. 6A that has been aligned with the actual aircraft 40 the 3D model represents, in accordance with certain embodiments. The sensor 60 can determine relative distances L1, L2, L3 between respective reference locations R1, R2, R3 and the sensor 60. The controller 250 can calculate, based on the virtual 3D space (in which the 3D model 270 is positioned relative to a sensor 60' which represents a virtual position of the sensor 60 in the virtual 3D space, the relative distances L1', L2', L3' between respective reference locations R1', R2', R3' (that are representative of the actual reference locations R1, R2, R3) and the virtual sensor 60' that is representative of the actual sensor 60.

The controller 250 can also determine respective angles A1, A2, A3 between the relative positions of the reference locations R1, R2, R3 and the virtual reference locations R1', R2', R3'. The controller 250 can also determine the relative distances L4, L5, L6 between the reference locations R1, R2, R3 and the respective virtual reference location R1', R2', R3'. With these measurements determined, the controller 250 can determine, based on at least some of the measurements, an adjustment of the 3D model 270 in the virtual 3D space to virtually align (or calibrate) the 3D model 270 in the virtual 3D space with the position of the actual aircraft 40 in the actual 3D ground operation space.

With the position in the virtual 3D space of the 3D model 270 relative to the virtual sensors 60' being known, and the 3D model 270 adjusted so that the position of the 3D model 270 in the virtual 3D space substantially equals the position of the aircraft 40 in the 3D ground operational space, then the controller 250 can control the one or more robotic arms 100 in the 3D ground operations space based on the position of the 3D model 270 in the virtual 3D space. FIG. 6B illustrates the 3D model 270 being adjusted to substantially align with the aircraft 40.

Figure 6C:
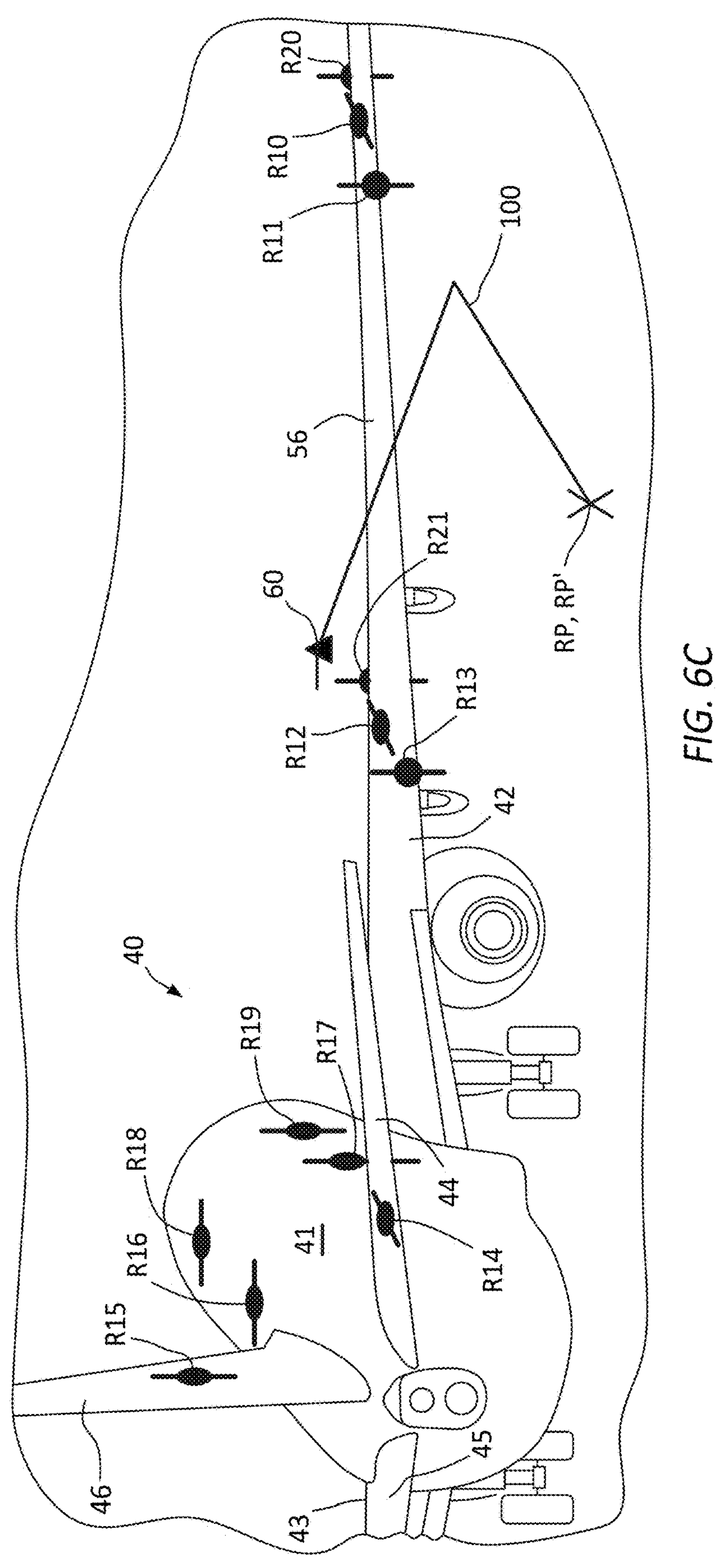
FIG. 6C is a representative functional diagram of a sensor mounted to a robotic arm to make measurements of a position of an actual aircraft in the 3D ground operation space relative to a reference point, with the measurements being used to align a 3D model of a virtual aircraft in a control system with the actual aircraft the 3D model represents, in accordance with certain embodiments.

FIG. 6C is a representative functional diagram of at least one sensor 60 mounted to a robotic arm to make measurements of a position and orientation of an actual aircraft in a 3D ground operation space relative to a reference point RP, with the measurements being used to establish or calibrate a 3D model 270 of a virtual aircraft in a control system 260 with the actual aircraft the 3D model represents, in accordance with certain embodiments. FIG. 6C illustrates an alternative way (or an additional way) to calibrate a 3D model 270 of an aircraft in virtual 3D space in a control system 260 to an actual aircraft 40 positioned within the 3D ground operation space. In this approach, one or more sensors 60 are positioned at or near an end of the robotic arm 100 (e.g., on the tool 140, on the wrist joint 200, on an upper end of the upper segment 130, etc.) and the robotic arm 100 moves the one or more sensors 60 to various locations about the aircraft 40 to determine the relative position of the location to a reference point RP. The reference point RP is preferably a point that is rigidly fixed to the surface 6, such that it does not move relative to the support structure of the robotic arm system 150. The one or more sensors 60 can also be moved along various surfaces to determine the relative position of multiple reference locations along the various surfaces.

Encoders are disposed in the robotic arm 100 to measure all rotational movements of the segments of the robotic arm 100. Therefore, at any time, the control system 260, to which the encoder data can be transmitted, knows the X-Y-Z position of the one or more sensors 60 relative to the reference point RP. Therefore, when the one or more sensors 60 detect a surface at a measured distance from the one or more sensors 60, then the control system 260 can calculate the X-Y-Z position of the surface in the 3D ground operation space. By measuring multiple locations of portions of surfaces on the aircraft 40, the control system 260 can determine the orientation of the aircraft 40 in the 3D ground operation space, including rotation, pitch, yaw relative to the reference point RP.

Since the reference point in the 3D ground operation space is defined in a virtual 3D space as a reference point RP', then the control system 260 (e.g., via the controller 250) can position the 3D model 270 in the virtual 3D space to align with (or be calibrated to) the actual aircraft 40 in the 3D ground operation space.

In a non-limiting example, reference locations R10-R21 can be measured via the one or more sensors 60 positioned proximate the end of the robotic arm 100 (e.g., on the tool 140, on the wrist joint 200, on an upper end of the upper segment 130) with the robotic arm 100 being manipulated by the control system 260 to move the one or more sensors 60 into a position that can measure each reference location R10-R21. For example, the one or more sensors 60 can be moved horizontally above the right wing 42 to measure the reference locations R11, R10, R20 (or as another example, reference locations R13, R12, R21). As the one or more sensors 60 are moved horizontally across the right wing 42, the one or more sensors 60 can measure the gap L8 (see FIG. 7) between the one or more sensors 60 and a top surface 56 on the right wing 42 at the reference location R10 and report the measurements to the control system 260. When the one or more sensors 60 are moved to the edge of the right wing 42, the one or more sensors 60 can detect and measure the edge of the right wing 42 relative to the one or more sensors 60 at the location R11 and report the measurements to the control system 260.

A similar process can be used to measure the other reference locations R12-R21, and these measurements can be transmitted to the control system 260 to calculate the positions of the reference locations R12-R21 in the 3D ground operation space relative to the reference point RP. With the relative positions of the reference locations R10-R21 determined, then the control system 260 can use these relative positions to orient the 3D model 270 in the virtual 3D space relative to the virtual reference point RP'. With the 3D model 270 calibrated to the position of the actual aircraft 40, then the control system 260 can proceed with manipulating the robotic arm 100 to perform the ground operation on the aircraft 40 in the 3D ground operation space based on the 3D model 270 in the virtual 3D space.

If multiple robotic arms 100 are to be used in the ground operation (e.g., as in FIGS. 2 and 3), then each of the robotic arms 100 can be used to measure multiple reference locations (e.g., reference locations R4-R21) on the aircraft 40. In this configuration, measurements from one robotic arm 100 can be used to verify measurements from another robotic arm 100. Alternatively, or in addition to, the multiple robotic arms 100 can measure multiple reference locations each and the control system 260 can use all (or at least a portion) of the measurements to identify any anomalies. Alternatively, or in addition to, one or more same reference locations can be measured by multiple robotic arms 100 to increase confidence in the orientation of the aircraft 40 in the 3D ground operation space.

Figure 7:
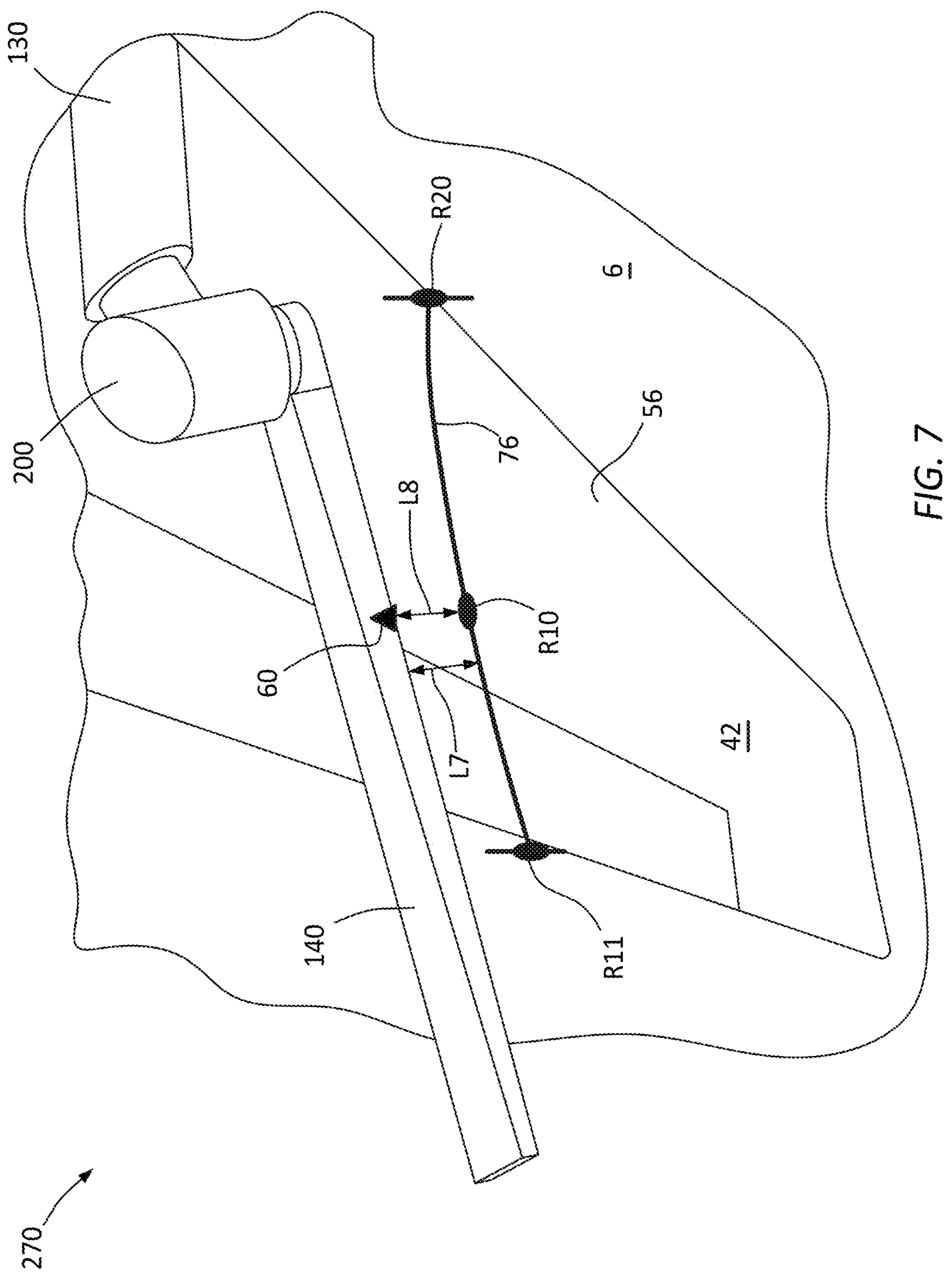
FIG. 7 is a representative perspective view of a tool at an end of a robotic arm that has been positioned at a desired distance from a surface of an aircraft component on which the tool is to perform a ground operation, in accordance with certain embodiments.

FIG. 7 is a representative perspective view of a tool 140 at an end of a robotic arm 100 that has been positioned at a desired distance from a surface of an aircraft component on which the tool 140 is to perform a ground operation, in accordance with certain embodiments. Similar to the discussion above regarding FIG. 6C, the robotic arm 100 can be used to measure the position of the aircraft 40 within the 3D ground operation space relative to the reference point RP. The robotic arm 100 can position the tool 140 above the surface 56 of the right wing 42 and measure the gap L8 between the one or more sensors 60 and the surface 56 at least at the reference location R10 (which can represent the center of the right wing 42 between reference points R11 and R20, with R10 indicating a height of the wing surface 56). As the robotic arm 100 moves the one or more sensors 60 along the surface 56 (such as aligned with line 76), the one or more sensors 60 can continue to measure the gap L8, but this continuous measurement is not required.

As the one or more sensors 60 reach an edge of the right wing 42 (e.g., reference location R20 or R21) and move across the wing to the other edge of the right wing 42 to the reference location R11 or R13), the one or more sensors 60 can detect the edges and the relative position of each edge to the one or more sensors 60 as well as the gap L8 at the middle of the right wing 42 (e.g., at reference location R10 between reference locations R11 and R20, or at reference location R12 between reference locations R13 and R21). Since the position of the one or more sensors 60 relative to the reference point RP can be determined by the encoder data from the robotic arm 100 encoders, then the position of the edge (at either reference location R11, R13, R21, or R20) can be determined. The control system 260 can use the calculated relative positions of the reference locations R4-R21) to calibrate the 3D model 270 in the virtual 3D space to mimic the actual position of the aircraft 40 in the 3D ground operation space.

Once the position of the 3D model 270 in the virtual 3D space has been calibrated to mimic the actual position of the aircraft 40 in the 3D ground operation space, the controller 250 can control the robotic arms 100 to position a tool 140 at a desired distance from a surface 56 of the aircraft 40, such as the right wing 42. The controller 250 can control the robotic arm 100 to transport the tool 140 along the surface 56 of the right wing 42 (or other surfaces of the aircraft 40) while maintaining a desired gap L7 between the tool 140 and the surface 56. By using the 3D model 270 to control manipulation of the tool 140, the controller can cause the tool 140 to maintain the desired gap L7 between the surface to be operated on and the portion of the tool 140 that is used to operate on the surface 56, even when the contour of the surface 56 is uneven, rounded, irregular, flat, etc. The gap L7 can also represent a desired average distance of the tool 140 from a target surface (e.g., surface 56) since the tool 140 can be long (e.g., 3 feet long).

Figure 8:
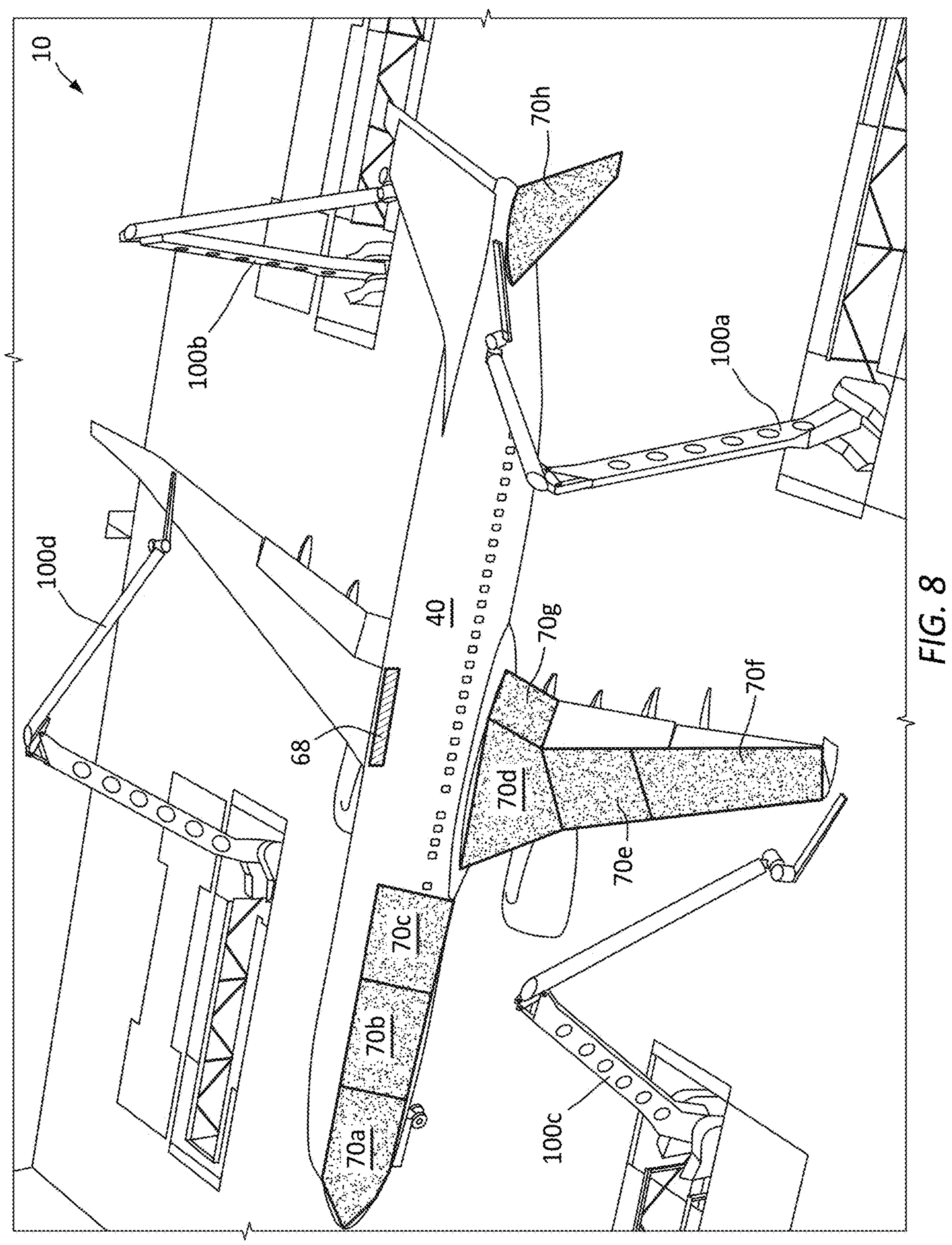
FIG. 8 is a representative perspective view of a system of robotic arms for performing a ground operation on an aircraft with example operational zones indicated, in accordance with certain embodiments.

FIG. 8 is a representative perspective view of a system 10 of robotic arms 100*a-d* for performing a ground operation on an aircraft 40 with example operational zones indicated, in accordance with certain embodiments. As stated above, the controller 250 can be used to control the robotic arms 100*a-d* to follow a contour of a surface to perform a ground operation on the surface (e.g., surface 56). However, surfaces on the aircraft 40 components (e.g., wings 42, 43, fuselage 41, etc.) may be very large and completing an operation on the large surface can take a significant amount of time.

If inspection (e.g., automatic inspection or operator inspection) determines that a performance score of the ground operation was not above a desired value, indicating that the ground operation was not successfully completed, then the controller 250 may determine to repeat the previous operation on that large surface based on the low score. Since the surface is large, the probability that the ground operation will fail can be higher than a probability of failure for a smaller surface. If the large surface fails inspection for success of the ground operation, then the control system 260 could have artificial intelligence determine the localized area that caused the failure and reoperate on just that smaller localized area, but the complexity required to implement this with the control system 260 can be greater than simply repeating the ground operation on the surface until the inspection passes. If the performance score for the ground operation on the surface of the vehicle is above the desired value, then the robotic arm 100 can proceed to the next step in the ground operation (e.g., proceed to perform the ground operation on the next surface area of the vehicle 40.

To simplify control of one or more robotic arms 100, increase efficiency of the ground operation, and minimize rework of surfaces that do not need additional treatment or operation, the surfaces of the aircraft 40 can be broken up into smaller portions, so if inspection of a particular smaller portion fails, then simply repeating the ground treatment on the smaller portion is completed faster, and does not require reoperating on the full larger surface. As can be seen in FIG. 8, the surfaces of the aircraft 40 have been broken up into smaller work zones 70 and keep out zones 68. The individual smaller work zones 70 can be operated on until inspection passes that work zone and the respective robotic arm 100*a-d* can move on to the next work zone 70 in its sequence of work zones to be processed. One robotic arm 100 may overlap one or more work zones 70 of another robotic arm 100, but generally the robotic arms 100 are assigned a unique set of work zones 70, and these work zones are different for each robotic arm 100.

In a non-limiting embodiment, a subset of smaller work zones are shown in FIG. 8 to illustrate this point. The entire aircraft 40 is not shown broken up into smaller work zones, but it should be understood that it is preferred to break up the surfaces of the aircraft (or at least the larger surfaces) into smaller more manageable work zones to improve efficiencies of performing the ground operations.

For example, the cockpit area 47 and a portion of the fuselage 41 are shown to have been broken up into at least work zones 70*a*, 70*b*, 70*c*, as well as a keep out zone 68 (e.g., a zone where performing the ground operation is not desirable). The remainder of the fuselage 41 can also be broken up into other smaller work zones, but this is not shown in FIG. 8.

For example, the left wing 43 can be broken up into work zones 70*d*, 70*c*, 70*f*, and 70*g* as well as other work zones. The left horizontal stabilizer 45 can be a single work zone 70*h*, if it is determined that the surface of left horizontal stabilizer 45 is small enough to accommodate the desired performance parameters of the ground operation. The other large surfaces can also be broken up into smaller work zones, if desired, or remain a large work zone if it is appropriate for the ground operation to be performed. For example, a robot manipulated inspection tool 140*b* may operate with sufficient efficiency that it can operate over larger areas than would be desirable for a de-icing tool 140*a* or a washing tool 140*d*. Therefore, the work zones can change in size and shape depending upon which ground operation is to be performed.

It should be also understood that FIG. 8 shows the aircraft 40 positioned substantially 180 degrees relative to the robotic arms 100*a-d* when compared to the aircraft shown in FIG. 3. This illustrates that the aircraft 40 can be positioned in a wide range of positions relative to the robotic arms 100 in the 3D ground operation space and the control system 260 can adapt the control of the robotic arms 100 to perform the ground operation.

Figure 9A:
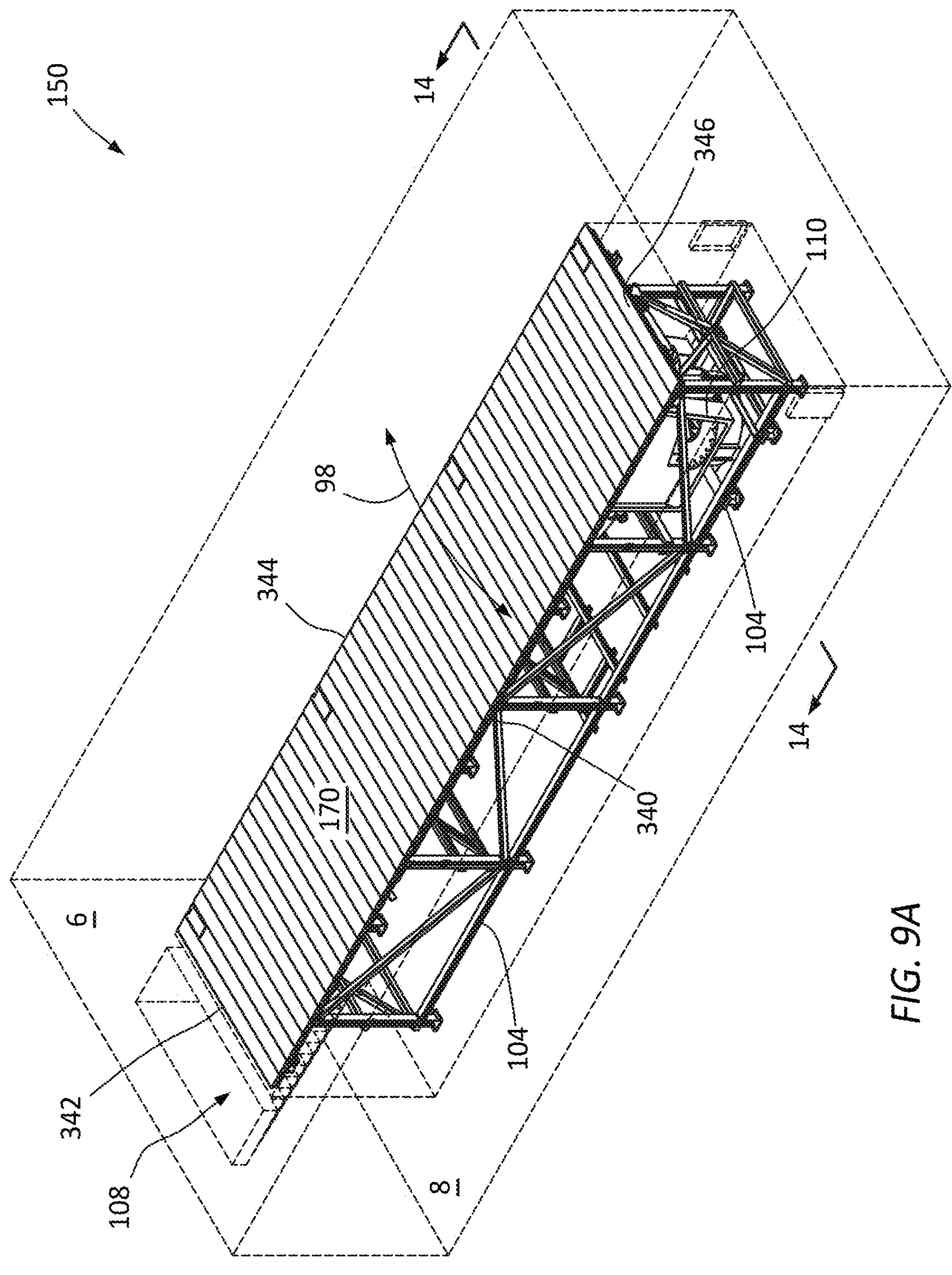
FIGS. 9A-9C are representative perspective views of a robotic arm system for manipulating a tool to perform a ground operation on a vehicle, the robotic arm being in various stages of deployment, in accordance with certain embodiments.
Figure 9B:
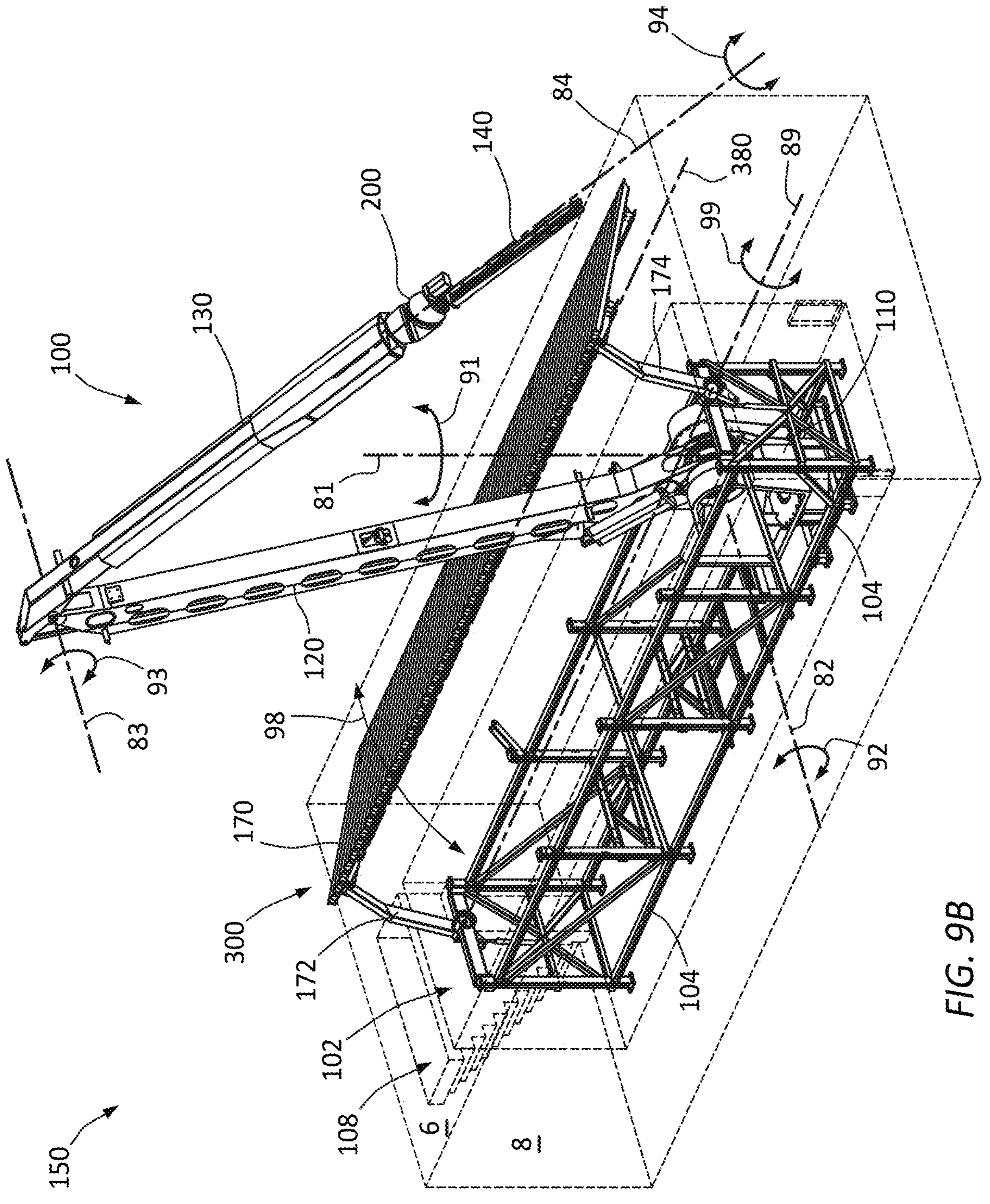
Figure 9C:
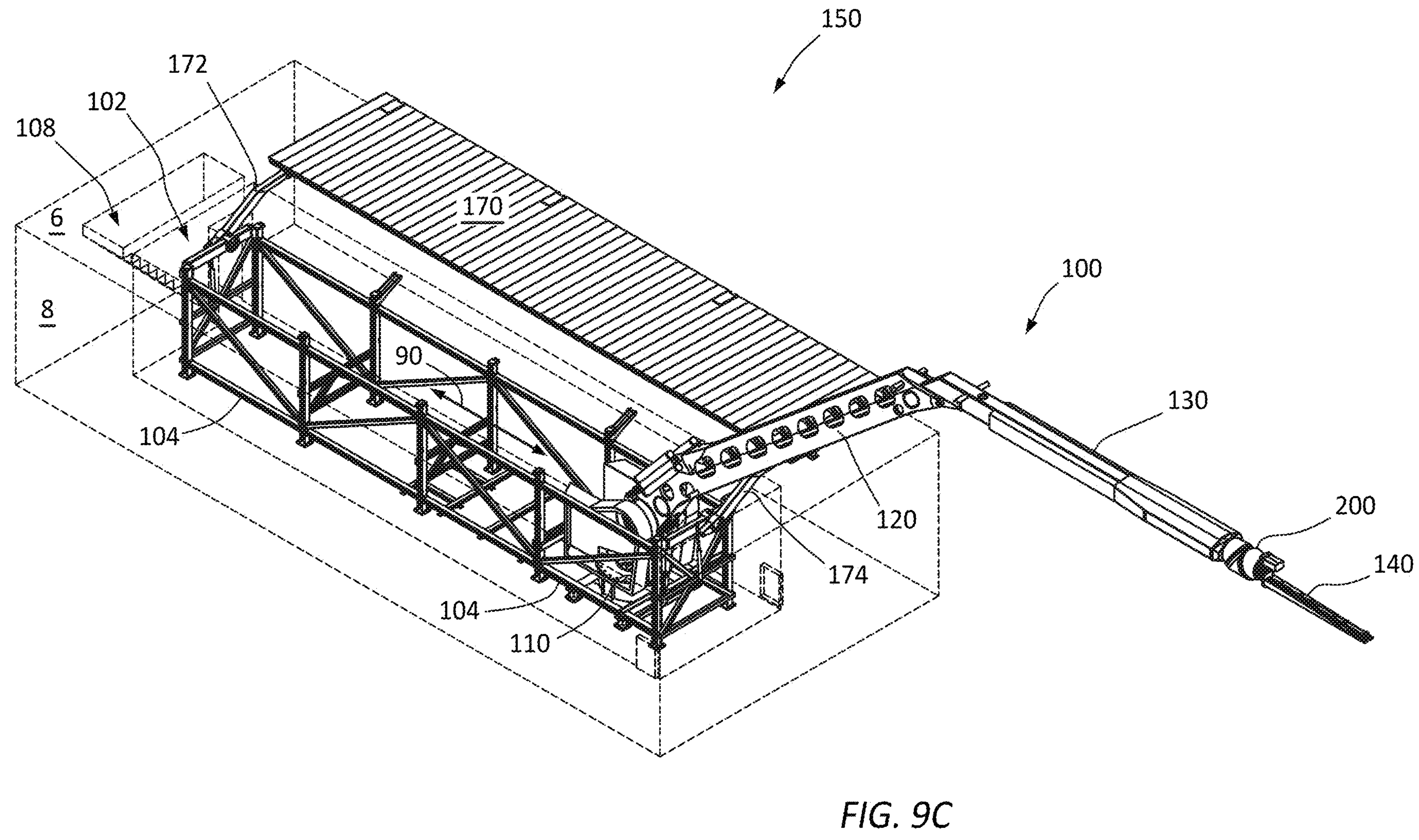
Figure 9D:
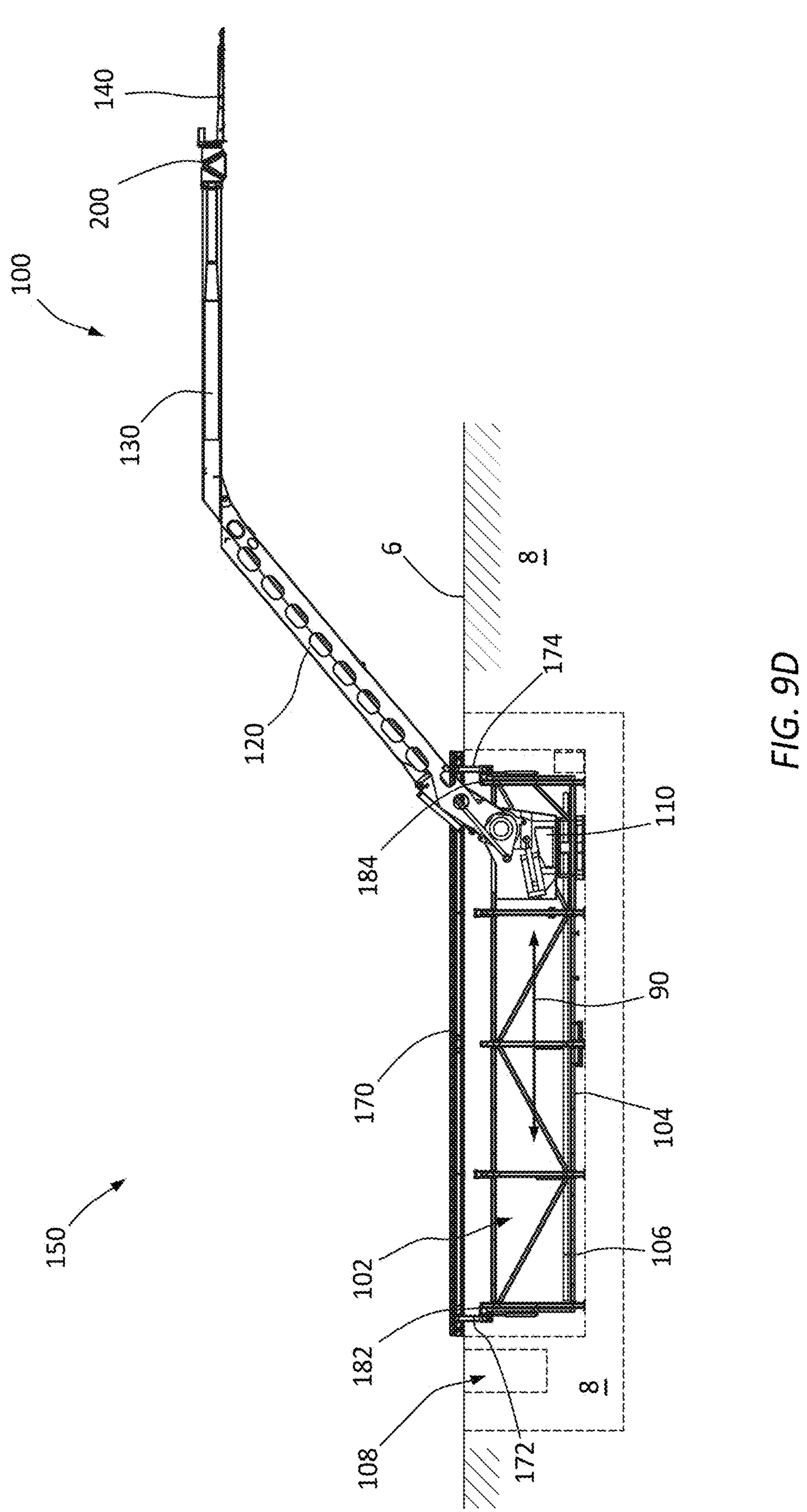
FIG. 9D is a representative partial cross-sectional side view of a robotic arm system for manipulating a tool to perform a ground operation on a vehicle, in accordance with certain embodiments.

FIGS. 9A-9C are representative perspective views of a robotic arm system 150 for manipulating a tool to perform a ground operation on a vehicle 40, the robotic arm 100 being in various stages of deployment, in accordance with certain embodiments. FIG. 9D is a representative partial cross-sectional side view of a robotic arm system 150 for manipulating a tool to perform a ground operation on a vehicle 40, in accordance with certain embodiments.

Referring to FIG. 9A, the robotic arm system 150 can include a support structure 104 that supports the robotic arm 100 and can support a cover 170 that can be moved (arrows 98) over a cavity into which the robotic arm 100 can be retracted to a stowed position. The cover 170 can include a left side 340, a front side 342, a right side 344, and a rear side 346. The robotic arm system 150 is shown disposed in a cavity below the surface 6 (in a formation 8), on which an aircraft 40 can be transported. However, it should be understood, in a non-limiting embodiment, the robotic arm system 150 can be disposed fully (or at least partially) above the surface 6, with the support structure 104 mounted at or above the surface 6.

Also not shown, are tracks 106 (see FIG. 9D) that, in certain embodiments, can allow horizontal translation of the robotic arm 100 along the tracks 106 to support additional mobility of the robotic arm 100. In a non-limiting embodiment, the tracks 106 can be positioned at or above the surface 6 and can allow the robotic arm 100 to translate horizontally along the tracks 106 in a horizontal X-Y plane. For example, the tracks can extend in an X direction for a desired distance and then curve to extend in a Y direction, or the tracks 106 can extend in an angled X-Y linear direction and then curve to extend in a different angled X-Y linear direction and then curve again to extend in a different angled X-Y linear direction. The base 110 of the robotic arm 100 can be directly coupled to the support structure 104 or coupled to the support structure 104 via the tracks 106. When the robotic arm 100 is disposed in a cavity in the ground, then an access 108 can be provided for personnel to descend into the cavity.

The following description regarding FIGS. 9B-9D describe a robotic arm operating from a cavity 102 in the ground with a cover 170 used to cover the cavity when the robotic arm 100 is in its stowed position in the cavity 102. However, it should be understood, as described above in reference to FIG. 9A, certain embodiments can have the robotic arm 100 positioned above the surface 6, which would not need a cover 170 or access 108.

Referring to FIG. 9B, the cover 170 has been moved (arrows 98) away from the cavity 102 to allow the robotic arm 100 to be rotated from the stowed position in the cavity 102 to a deployed position with at least a portion of the robotic arm 100 partially extending out of the cavity 102. The cover 170 can be moved by rotating (arrows 99) the lift arms 172, 174 about the common axis 89.

The base 110 of the robotic arm 100 can rotationally couple the robotic arm 100 to the support structure 104, such that the robotic arm 100 can rotate (arrows 91) about the generally vertical axis 81. In certain embodiments, rotation of the robotic arm 100 about the axis 81 can be allowed after the lower segment 120 is rotated from the stowed position by rotating (arrows 92) the lower segment 120 about the generally horizontal axis 82. When the lower segment 120 is sufficiently raised from the cavity 102, then the base 110 can rotate the robotic arm 100 about the axis 81.

The robotic arm 100 can include an upper segment 130 that can be rotationally coupled to the lower segment 120, such that the upper segment 130 can be rotated (arrows 93) about the generally horizontal axis 83. A wrist joint 200 can be rotationally coupled to an end of the upper segment 130, such that the wrist joint 200 can be rotated (arrows 94) about an arm axis 84 of the end of the upper segment 130. By rotating the various components of the robotic arm 100 about the axes 81, 82, 83, 84, the controller 250 can manipulate the robotic arm 100 to position the tool 140 to a desired location in the 3D ground operation space. The wrist joint 200 can be used to manipulate the tool 140 into the desired orientation to perform the desired ground operation on surfaces of the vehicle 40.

Referring to FIG. 9C, the robotic arm 100 has been rotated to its max extension without rotating the base 110. However, the base 110 can rotate the robotic arm 100 by up to 360 degrees while rotating the other segments to position the tool 140 at a desired location.

Referring to FIG. 9D, the robotic arm 100 has been rotated to its max extension without rotating the base 110. The cross-sectional view shows the support structure 104 positioned in the cavity 102 and coupled to the base 110. In a non-limiting embodiment, the support structure can include tracks 106, along which the base 110 can be translated (arrows 90). However, in a preferred embodiment, the base 110 is coupled to the support structure 104 without the tracks 106, thus allowing rotation of the robotic arm 100 about the axis 81, but not providing for horizontal translation of the robotic arm 100 along the cavity 102. Motors 182, 184 can be used to open and close the cover 170, by rotating the lift arms 172, 174.

Figure 10:
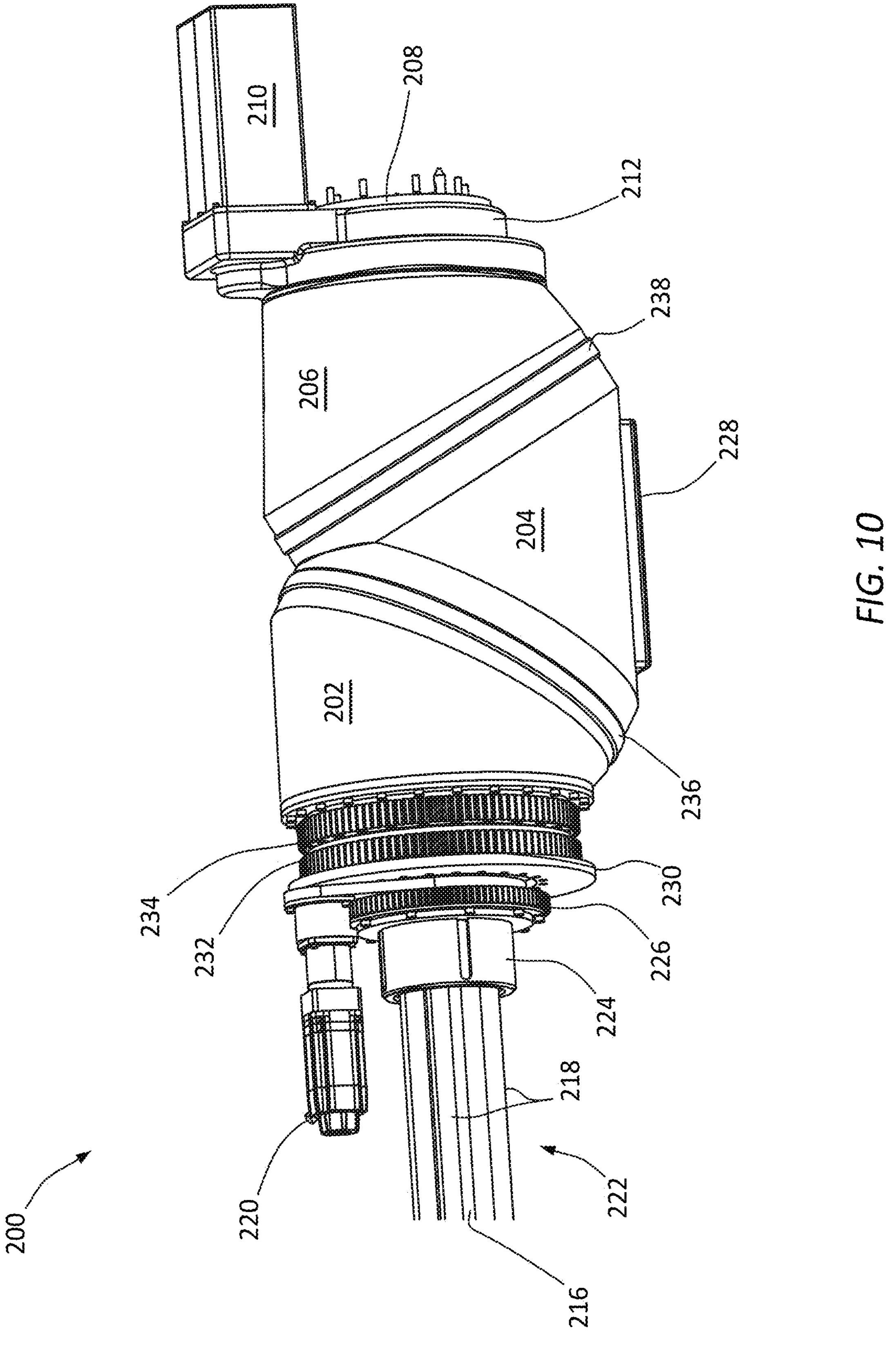
FIG. 10 is a representative perspective partially translucent view of a wrist joint of a robotic arm, in accordance with certain embodiments.

FIG. 10 is a representative perspective view of a wrist joint 200 of a robotic arm 100, in accordance with certain embodiments. The wrist joint 200 can have multiple hoses 222 extending through a center hollow portion of the wrist joint 200 to a tool interface 208. The multiple hoses 222 can include a plurality of hoses 218 which can be helically wrapped around a center hose 216.

The wrist joint 200 can include multiple wedge-shaped generally cylindrical segments 202, 204, 206 with each end of each segment forming a plane, such that the planes formed by opposite ends of a segment are angled relative to each other. However, planes of adjacent segment ends are substantially parallel with each other. Each of these segments 202, 204, 206 can be rotated relative to the other segments such that the wedge-shapes can cause the tool interface 208 to be rotated from a "0" zero angle where the tool axis 87 (see FIG. 12) of the tool interface 208 is substantially parallel with the arm axis 84 of the end of the upper segment 130.

A hose motor 220 can be rotationally fixed to the upper segment 130 via the portion 230. The hose motor 220 can drive the gear 226 to cause the hose coupling 224, which is coupled to the multiple hoses 222, to rotate the hoses 222 relative to the portion 230. The drive gears 232 and 234 can be used to rotate the segments 202, 204, 206 to articulate the wrist joint 200 to position a tool 140 (not shown) at a desired angle and orientation relative to the upper segment 130.

The tool interface 208 can be rotated by a tool motor 210 which can cause the tool interface 208 and the tool motor segment 212 to rotate relative to the segment 206. The tool motor 210 rotates with the tool motor segment 212 and the tool interface 208, when they are rotated. The access port 228 provides operator access to the internal hollow space of the wrist joint 200 for maintenance activities, such as cleaning, repair, assembly, or disassembly.

Figure 11A:
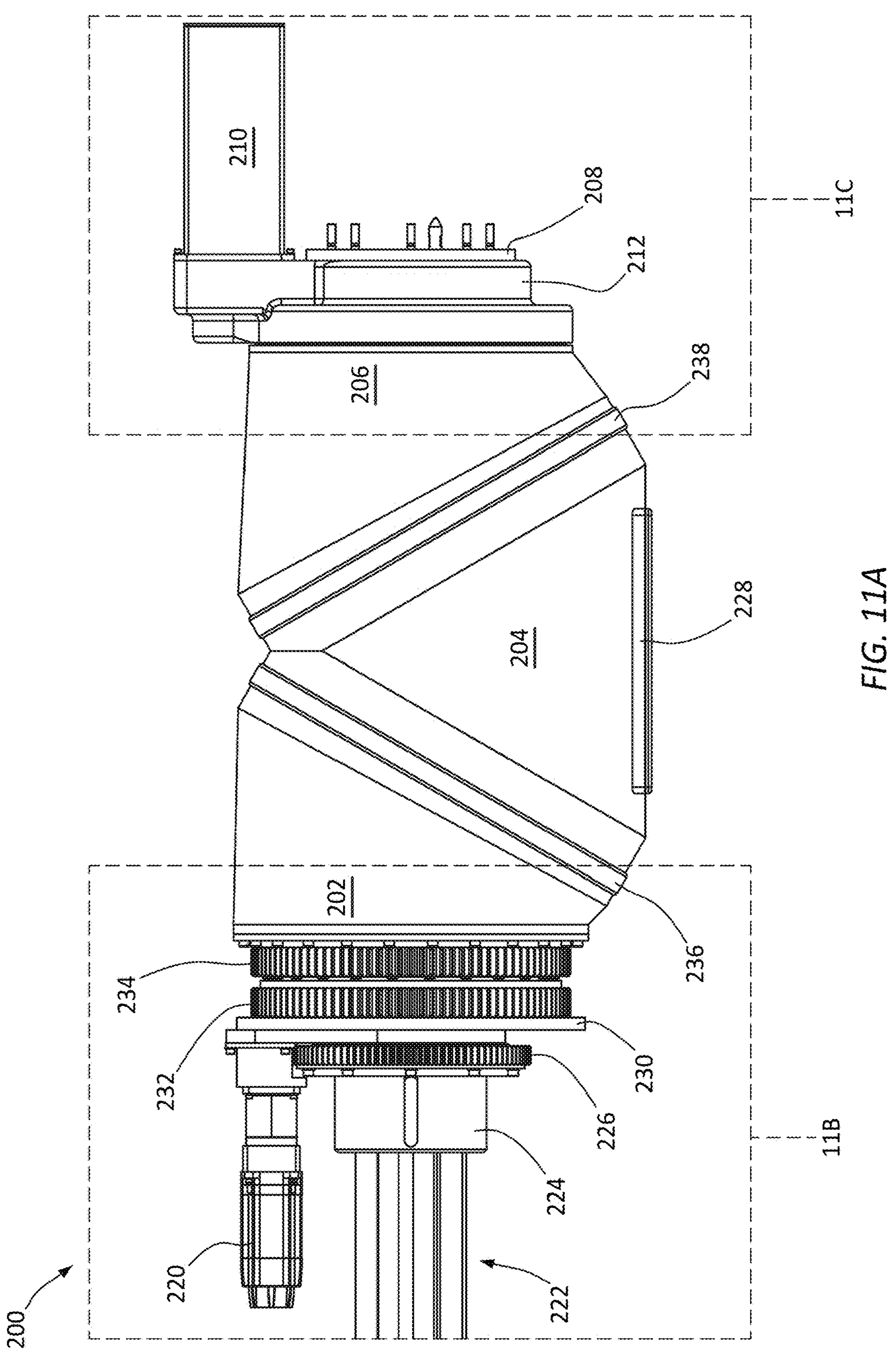
FIG. 11A is a representative side view of a wrist joint of a robotic arm for manipulating a tool to perform a ground operation, with the wrist joint positioned in a substantially "0" zero degree deviation of a tool axis from an arm axis, in accordance with certain embodiments.

FIG. 11A is a representative side view of a wrist joint 200 of a robotic arm 100 for manipulating a tool 140 to perform a ground operation, with the wrist joint 200 positioned in a substantially "0" zero degree deviation of a tool axis 87 from an arm axis 84 (see FIG. 11B, 11C, 12), in accordance with certain embodiments. The end of the upper segment 130 of the robotic arm 100 is not shown for illustration purposes, but the portion 230 is rotationally fixed to the upper end of the upper segment 130 so the rotationally elements can be referenced relative to the upper segment 130. The hose motor 220 can drive the gear 226 to rotate the hoses 222, via the coupling 224, about the arm axis 84 to maintain a rotational orientation with the tool interface 208, when the tool interface 208 needs to be rotated (arrows 97), via the tool motor 210, relative to the tool axis 87, regardless of the rotational positions of the segments 202, 204, 206. Sleeves 236, 238 overlap a gap between adjacent segments 202, 204, 206 that allows rotation of the adjacent segments 202, 204, 206 relative to each other.

Figure 11B:
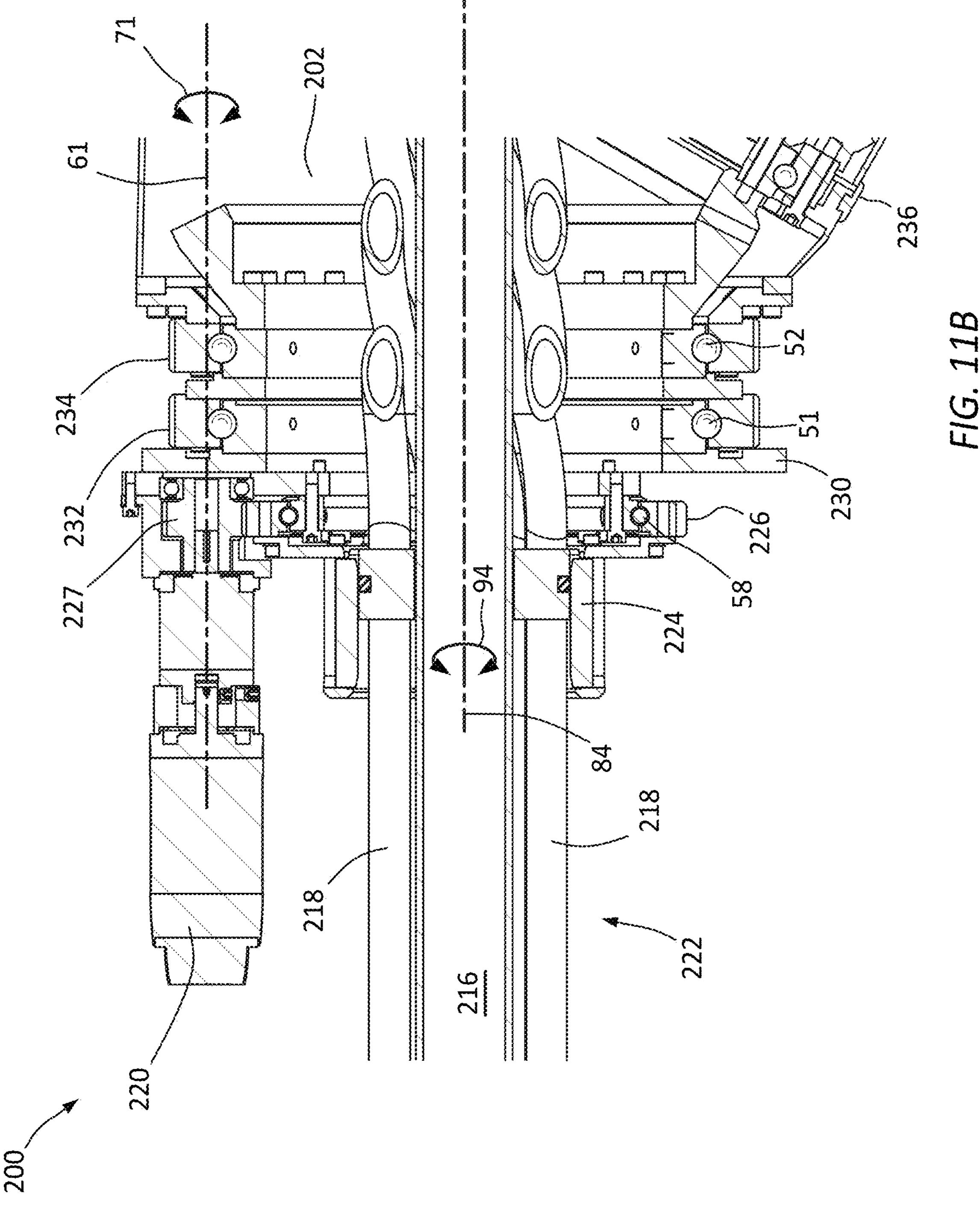
FIG. 11B is a representative cross-sectional side view of a portion 11B of the wrist joint of FIG. 11A, in accordance with certain embodiments.

Referring now to FIG. 11B, the hose motor 220 can drive a gear 227 (arrows 71) about a hose motor axis 61. The drive gear 227 can be engaged with the drive gear 226, which can be rotationally coupled to the portion 230 via the bearing 58.

Figure 12:
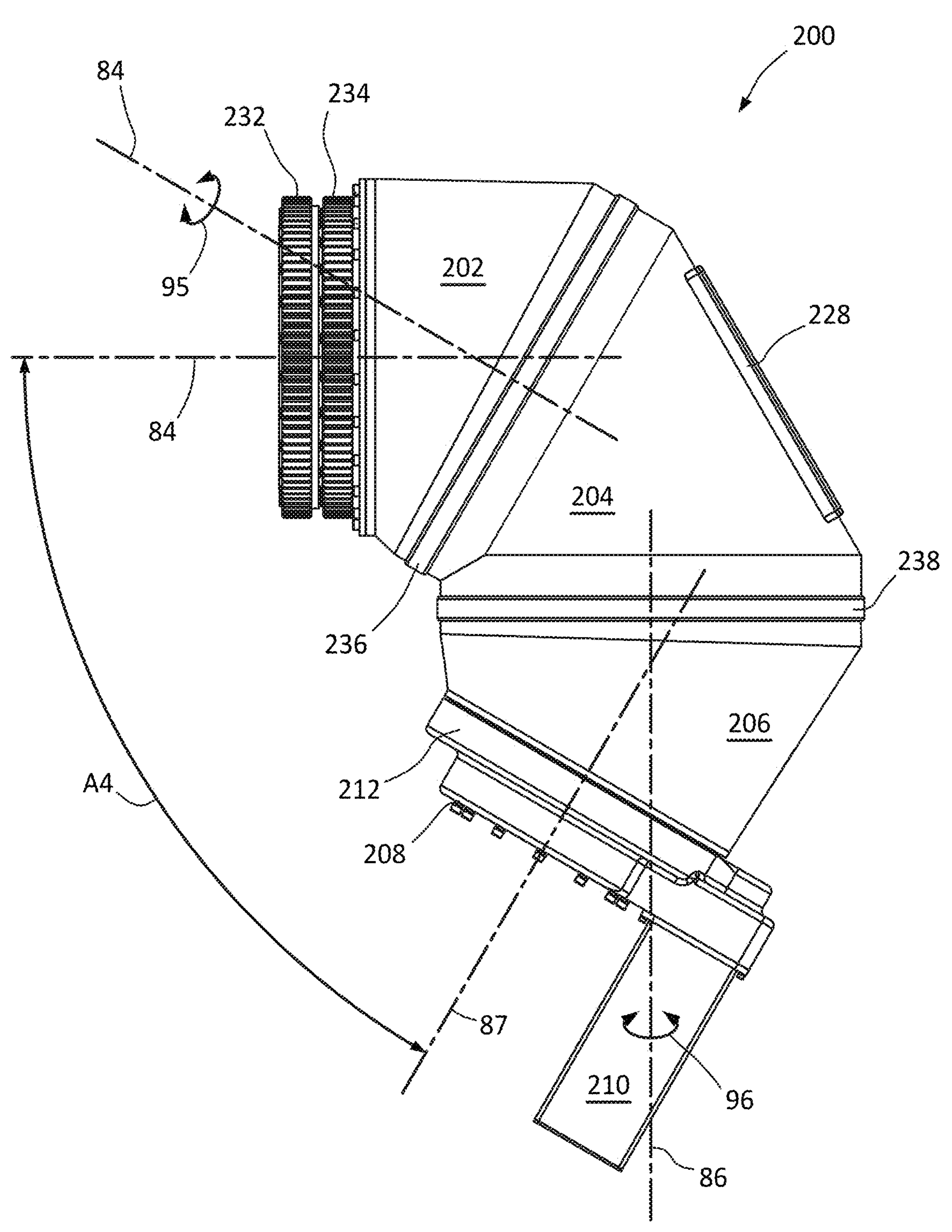
FIG. 12 is a representative cross-sectional side view of a wrist joint of a robotic arm for manipulating a tool to perform a ground operation, with the wrist joint positioned in a substantially 120 degree deviation of a tool axis from an arm axis, in accordance with certain embodiments.

Rotation of the drive gears 232 and 234 (which can be rotationally coupled to the portion 230 via bearings 51, 52, respectively) can rotate the wrist joint 200 (arrows 94) about the arm axis 84 and rotate the segments 202, 204, 206 relative to each other so the wrist joint 200 is articulated to angle the tool axis 87 from "0" zero degrees (i.e., substantially parallel with the arm axis 84) up to 120 degrees in certain embodiments, up to 140 degrees in certain embodiments, or up to 160 degrees in certain embodiments. The current configuration in FIG. 11A is configured to articulate the wrist joint 200 from "0" zero degrees to 120 degrees. As seen in FIG. 12, the wrist joint 200 has been articulated to an angle A4 of substantially 120 degrees, but it should be understood that other articulation angles A4 are available in keeping with the principles of this disclosure.

Figure 11C:
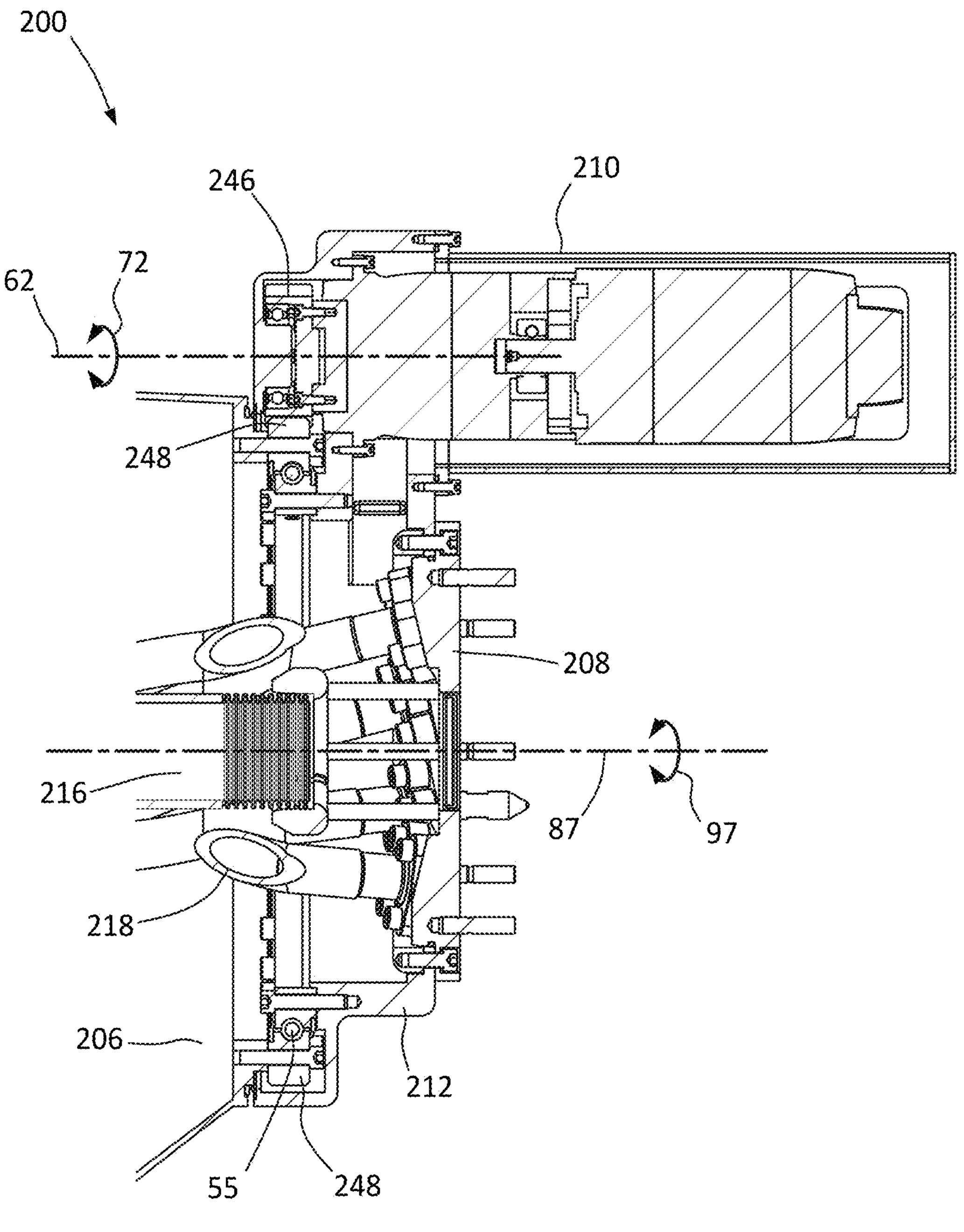
FIG. 11C is a representative cross-sectional side view of a portion 11C of the wrist joint of FIG. 11A, in accordance with certain embodiments.

Referring now to FIG. 11C, the tool motor 210 can drive a gear 246 (arrows 72) about tool motor axis 62. The gear 246 can be engaged with the gear 248 to drive rotation of the tool interface 208 about the axis 87. The gear 248 can be rotationally fixed to the segment 206. The tool motor 210 can be rotationally fixed to the tool motor segment 212, which can be rotationally coupled to the gear 248 via the bearing 55. Therefore, when the tool motor 210 drives the gear 246, since the gear 248 is rotationally fixed to the segment 206, the tool motor 210 and the gear 246 walk around the gear 248 and rotate about the tool axis 87 relative to the segment 206.

Figure 13:
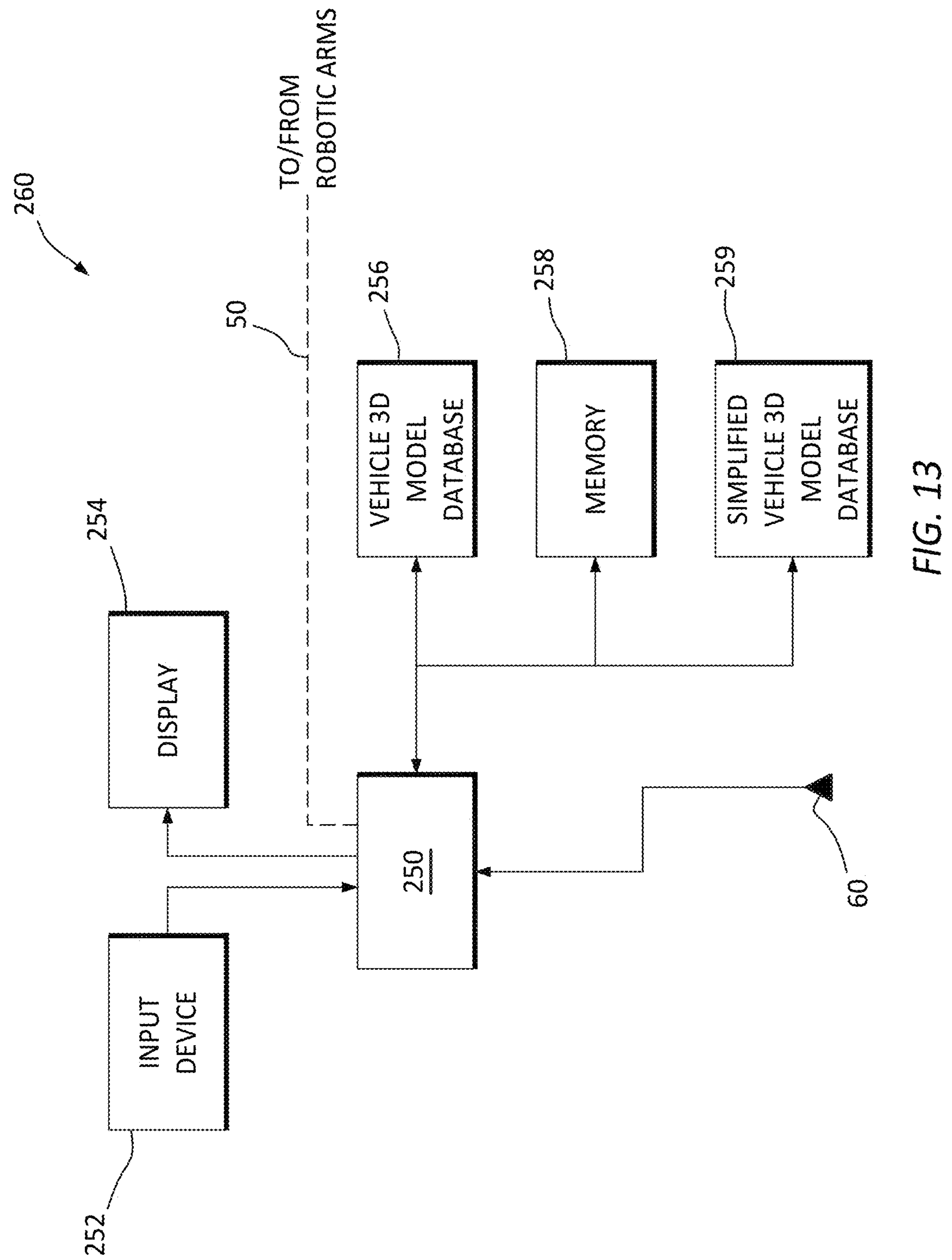
FIG. 13 is a representative block diagram of a control system for a robotic arm system, in accordance with certain embodiments.

FIG. 13 is a representative block diagram of a control system 260 for a robotic arm system 150, in accordance with certain embodiments. The controller 250 can receive 3D models of a particular vehicle 40 from a database 256 (or via the network 50 from an external source), on which the ground operation is to be performed. A non-transitory memory 258 can be used to store program instructions as well as data for the virtual 3D space. One or more sensors 60 can collect data from the 3D ground operation space (i.e., the actual space in which the vehicle 40 will undergo the ground operation). The controller 250 can be communicatively coupled to the robotic arms 100 via a wired or wireless network 50 for controlling the robotic arms 100 to perform the ground operation on the vehicle 40.

The robotic arms 100 can include one or more additional sensors 60 used to detect proximity of surfaces or other objects to the robotic arm 100 and to predict and prevent collisions of the robotic arm 100 (or tool 140) with another robotic arm 100, another tool 140, or a surface of the vehicle 40. The anti-collision data from the one or more sensors 60 can be transmitted to the controller 250 via the network 50. This can also prevent collisions with the vehicle 40 when the 3D model is incorrect in some aspect.

These sensors 60 on the robotic arms 100*a-f* can also be used to detect surfaces of the vehicle 40 to determine the actual position of the vehicle 40 relative to the robotic arms 100*a-f*. This data, along with encoder data from the robotic arms 100*a-f*, can be used to calibrate the position of the 3D model in the virtual 3D space, as previously described. The encoder data can be transmitted from encoders of the robotic arms 100*a-f* that track rotational movements of the robotic arm pivot joints, and along with the detected surfaces, can be used to calculate the actual position of the position of the aircraft 40 in the 3D ground operation space.

The database 259 can include simplified 3D models of the various vehicles with an additional bounding volume established around the virtual vehicle 40 (or 3D model 270), such that if a robotic arm 100 or tool 140 enters the bounding volume, then a stop command can be sent to the controller 250 to stop movement of the robotic arm 100 until a possible collision can be avoided.

An operator interface (e.g., an input device 252 and a display 254) can be communicatively coupled to the controller 250 to allow the operator to provide feedback to the controller 250, select operations to be performed, receive approvals from the operators indicating pass or fail of at least a portion of the ground operation being performed on the vehicle 40, select type of vehicle 40 to be operated on, display to the operator progress of the ground operation, as well as various other operator interface functions to support initiation and completion of the ground operation. The display can be used to display progress of the ground operation while the control system 260 autonomously controls the robotic arms 100 during the execution of the ground operation.

FIGS. 14A-14C, 14E, 14F are representative partial cross-sectional end views, as viewed along the line 14-14 in FIG. 9A, of a cover system 300 that can include a support structure 104 with a frame 180 positioned below ground and with a moveable cover 170, in certain embodiments, rotationally coupled to the frame 180. With a robotic arm 100 in a stowed position in a cavity 102 in the subterranean formation 8 that is below the surface 6, a cover 170 can be positioned over the cavity 102 to protect the equipment in the cavity, provide safety for personnel working on or above the surface 6, and provide structure support for any vehicle or equipment that is transported across the cover 170.

The cover 170 is configured to support the weight of a fire truck that is fully loaded with water or fire retardant. This can cause the actual weight of the cover 170 to be high to meet these strength requirements. Additionally, the cover 170 is designed to actuate between a fully closed position and a fully open position in less than three minutes, or less than two minutes, or less than one minute, or less than 45 seconds, or less than 30 seconds, or less than 15 seconds that can be required of the moveable cover 170 to meet safety requirements during emergency conditions on the surface 6 (e.g., the tarmac). Additionally, the robotic arm 100 is designed to move from a fully extended position (e.g., FIGS. 9C and 9D) to a fully stowed position in the cavity 102 in less than three minutes, or less than two minutes, or less than one minute, or less than 45 seconds, or less than 30 seconds, or less than 15 seconds that can be required of the robotic arm 100 to meet safety requirements during emergency conditions on the surface 6 (e.g., the tarmac).

Figure 14A:
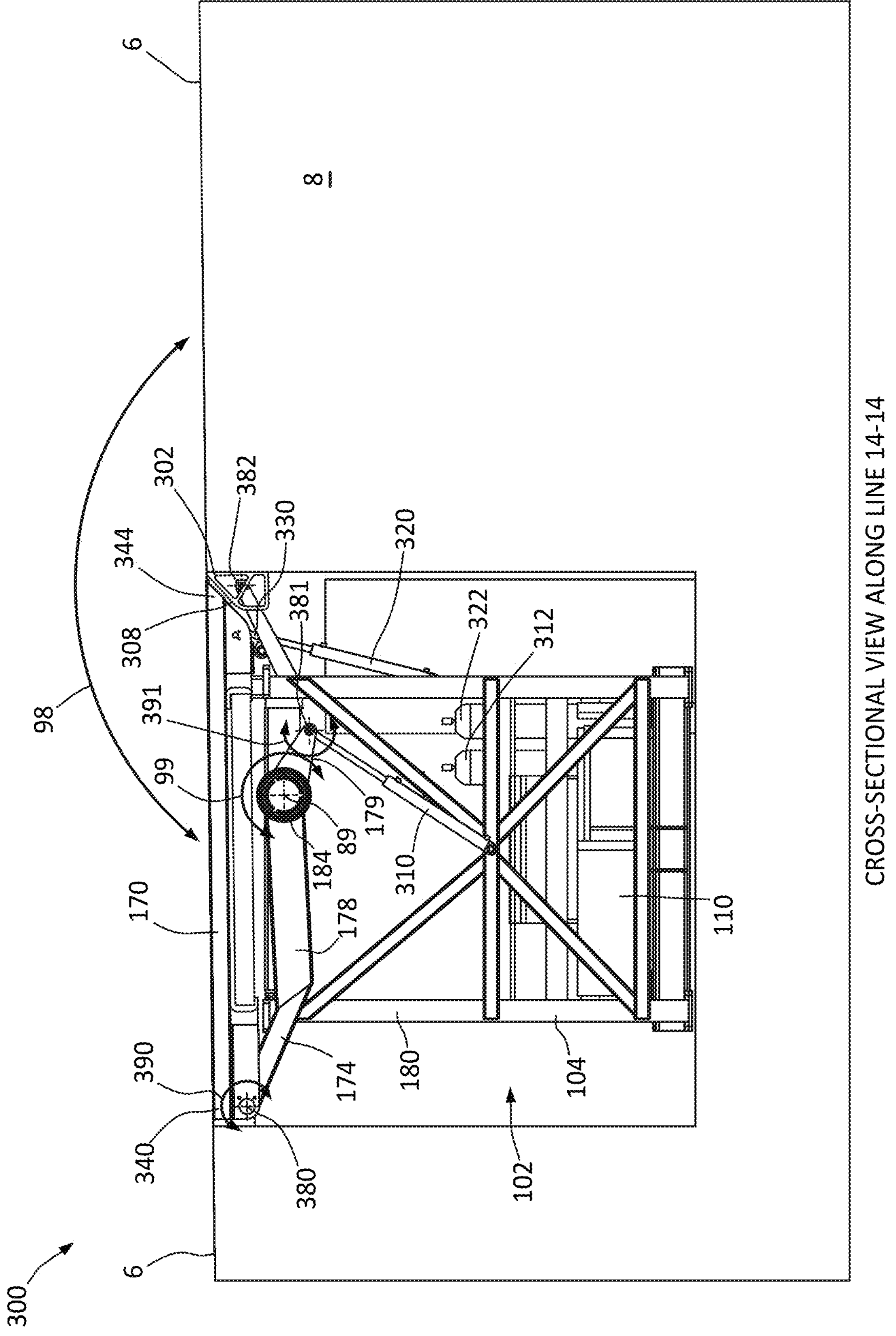
FIGS. 14A-14C, 14E, 14F are representative partial cross-sectional end views, as viewed along the line 14-14 in FIG. 9A, of a support structure with a moveable cover, in certain embodiments.

Referring to FIG. 14A, the cover 170 is shown in a fully closed position, preferably with a top surface of the cover 170 being substantially aligned with the surface 6. However, the top surface of the cover 170 can be above or slightly below the surface 6, if desired, yet substantially parallel with the surface 6. The following discussion is related to the features shown in the partial cross-section view along line 14-14 indicated in FIG. 9A, which generally focuses on the operation of a lift arm 174, as well as the gas springs 310, 320 and the wheel 330. However, it should be understood that this explanation equally applies to the other lift arm 172, not shown in this view. The lift arms 172, 174 operate together to move the cover from the fully closed position to a partially open or fully open position and back again to the fully closed position as needed to stow or deploy the robotic arm 100.

The lift arm 174 can be rotationally coupled to a left side 340 of the cover 170 at one end at a pivot axis 380 and rotationally coupled (arrows 391) at an opposite end to one end of a gas spring 310 at a pivot axis 381. The lift arm 174 is also rotationally coupled to the frame 180 at a pivot axis 89 which is positioned in the lift arm 174 between the opposite ends of the lift arm 174. The lift arm 174 forms a first lever arm 178 between the pivot axis 89 and the pivot axis 380 and a second lever arm 179 between the pivot axis 89 and the pivot axis 381, with the second lever arm 179 extending from pivot axis 89 at an angle relative to the first lever arm 178 extending from the pivot axis 381.

A motor 184 can be used to drive rotation (arrows 99) of the lift arm 174 about the pivot axis 89, thereby rotating the first and second lever arms 178, 179 about the pivot axis 89. The gas spring 310 is configured to apply a pulling force to the second lever arm 179 at the pivot axis 381. This applied pulling force can be provided to assist a rotational force applied by the motor 184 to the lift arm 174 to lift the cover 170. Therefore, with the pulling force, the cover 170 can be rotated from the closed position more quickly than if the motor 184 alone were used to rotate the lift arm 174.

The pulling force acts as a load compensator to basically apply a counterbalance force to the second lever arm 179 to at least partially offset the force needed to lift the left side 340 of the cover 170. When the left side 340 of the cover 170 is to be lifted from the closed position, the motor 184 only has to lift the weight difference between the force needed to lift the left side 340 of the cover 170 and the pulling force supplied by the gas spring 310.

The gas spring 310 can be supplied a pressurized gas by a reservoir 312 that can pre-charge the gas spring to a desired pressure that sufficiently applies a pulling force to support rotation of the lift arm 174. The rotational force applied to the second lever arm 179 by the pulling force varies as the lift arm 174 rotates about the pivot axis 89 mainly due to the radial position of the second lever arm 179 about the pivot axis 89.

When the motor 184 begins to rotate the lift arm 174 upward, the pulling force applied to the second lever arm 179 can be applying a substantially maximum rotational force to the second lever arm 179. This is advantageous, since the force needed to move the cover 170 is greatest at the beginning when the cover 170 is being lifted from the closed position upward away from the frame 180.

Another gas spring 320 is rotationally coupled to the frame 180 (coupling not shown) at one end with the other end rotationally coupled to a bias arm 304 (see FIG. 14B) at a pivot axis 383. When the motor 184 begins to rotate the first lever arm 178 of the lift arm 174 upward, the gas spring 320 acts to provide a lifting force to the bias arm 304 to assist in lifting the right side 344 of the cover 170 upward. The gas spring 320 can be supplied with pressurized gas by the reservoir 322, which can be used to pre-charge the gas spring 320 such that it continuously applies a lifting force to the bias arm 304. Therefore, it takes less force to begin rotation of the cover 170 upward from the frame 180.

The frame 180 can also include multiple inclined brackets 302 with an inclined surface 308. As the cover 170 is being lifted, a wheel 330 can engage the inclined surface 308 and roll along the inclined surface 308 to raise the right side 344 of the cover 170 upward from the frame 180 and the cavity 102.

Figure 14B:
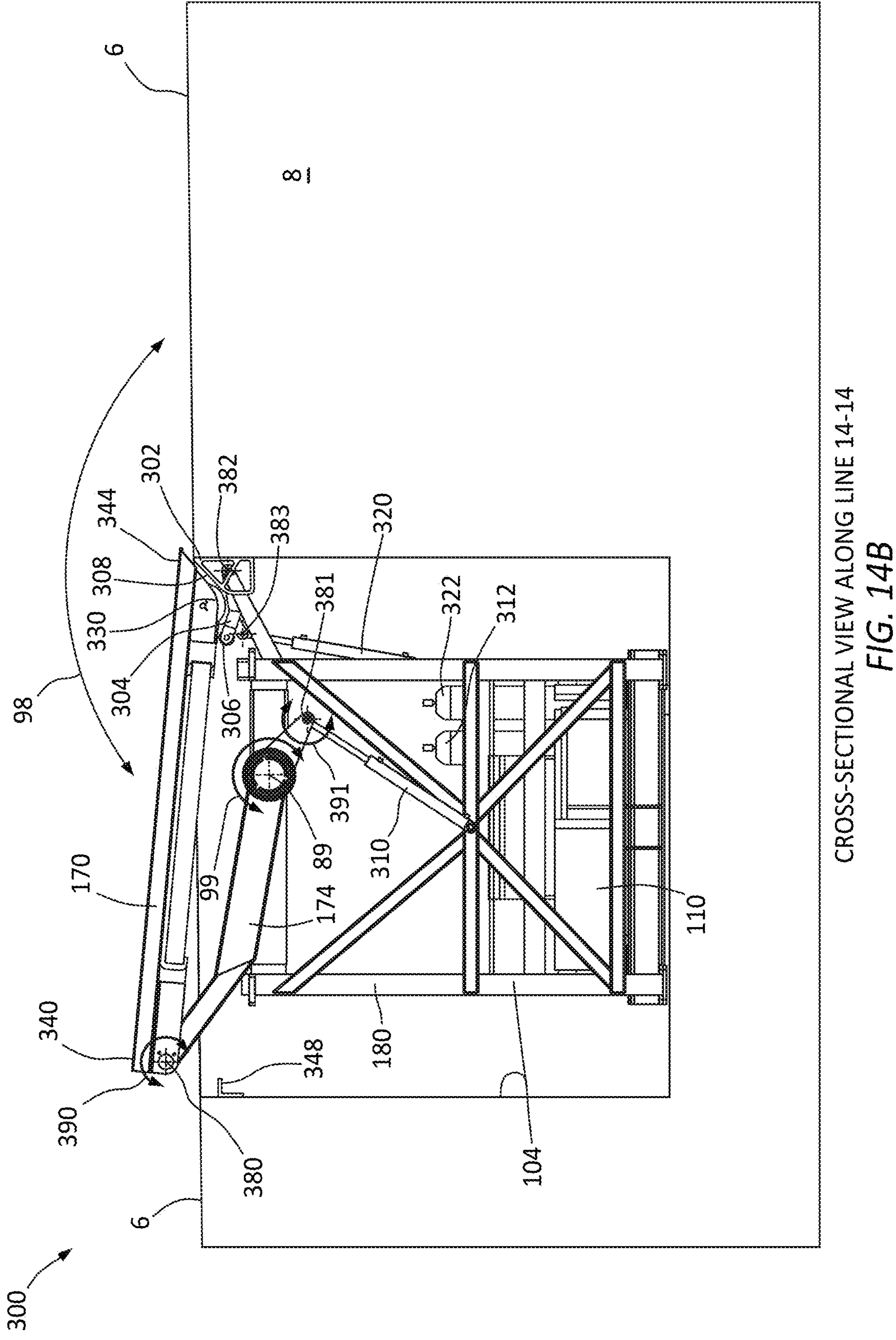

Referring to the FIG. 14B, the lift arm 174 has been initially rotated about the pivot axis 89, such that the left side 340 of the cover 170 has been lifted upward from the frame 180. The first lever arm 178 has been rotated upward, while the second lever arm 179 has been rotated downward. The gas spring 310 continues to apply the pulling force to the pivot axis 381, urging clockwise rotation of the lift arm 174 with the motor 184 driving clockwise rotation of the lift arm 174. The lift arm 174 will rotate (arrows 390) about the pivot axis 380 relative to the cover 170 as the lift arm 174 is rotated clockwise about pivot axis 89. The wheel 330 can engage the inclined surface 308 and cause the right side 344 to be raised from the cavity 102, with the additional assistance of the gas spring 320, which provides a lifting force to the bias arm 304 and rotates the bias arm 304 about the pivot axis 382.

The bias arm 304 can include a roller 306 positioned at an end of a segment of the bias arm 304, where the segment is extended from the main body of the bias arm 304 to a vertical position elevated above the pivot axis 383. The gas spring 320 provides a lifting force applied to the bias arm 304 at the pivot axis 383 and urges the right side 344 of the over 170 upward. When the lift arm 174 begins to raise the left side 340 from the cavity 102, the wheel 330 can engage the inclined surface 308 while the bias arm 304 urges the right side 344 upward. The combined forces of the lift arm 174 acting on the left side 340, the gas spring 320 acting on the bias arm 304, and the wheel 330 engaging the inclined surface 308, the cover 170 can rotate away from the closed position.

A support flange 348 can be used to support the edges of the cover 170 when it is in a fully closed position as shown in FIG. 14A. The support flange 348 can be fixedly attached to outside walls of the support structure 104 (i.e., walls positioned at the inside walls of the cavity) and positioned such as to engage portions of the edges of the cover 170 when it is fully closed. The support flange 348 can be positioned around the four sides of the cavity to engage accessible portions of the edges on the left side 340, the front side 342, the right side 344, and the rear side 346 of the cover 170. This support flange 348 can help prevent tipping of the cover 170 when a wheel of the vehicle 40 rolls over the closed cover 170. The support structure 104 can be used to lower the cover 170 into engagement with the support flanges 348 around a perimeter of the cavity or raise the cover 170 to disengage from the support flanges 348, such as when the cover is being opened.

Figure 14C:
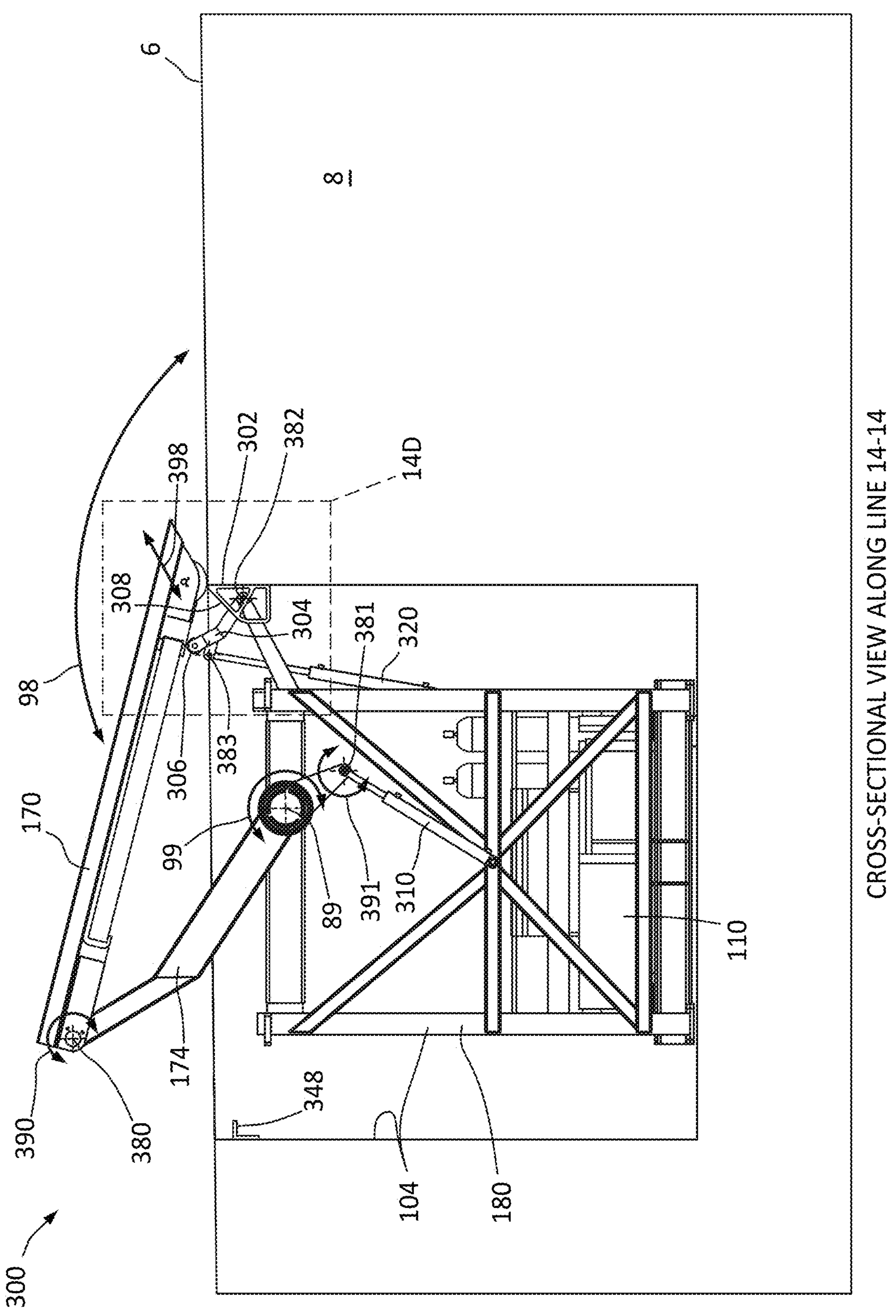

Referring to FIG. 14C, the lift arm 174 has forced the left side 340 further upward, and forced the right side 344 to move upward (arrows 398) to the end of the inclined surface 308. The roller 306 engages a bottom surface of the cover 170 and allows the bottom surface to move relative to the roller 306, thus allowing the wheel 330 to roll up the inclined surface 308 (arrows 398). At this stage of deployment, the cover 170 is rotated further from the closed position than shown in FIG. 14B. The rotational force being applied by the gas spring 310 to the second lever arm 179 begins to be reduced, because the perpendicular distance from the vector of the pulling force and the pivot axis 89 is beginning to decrease.

Figure 14D:
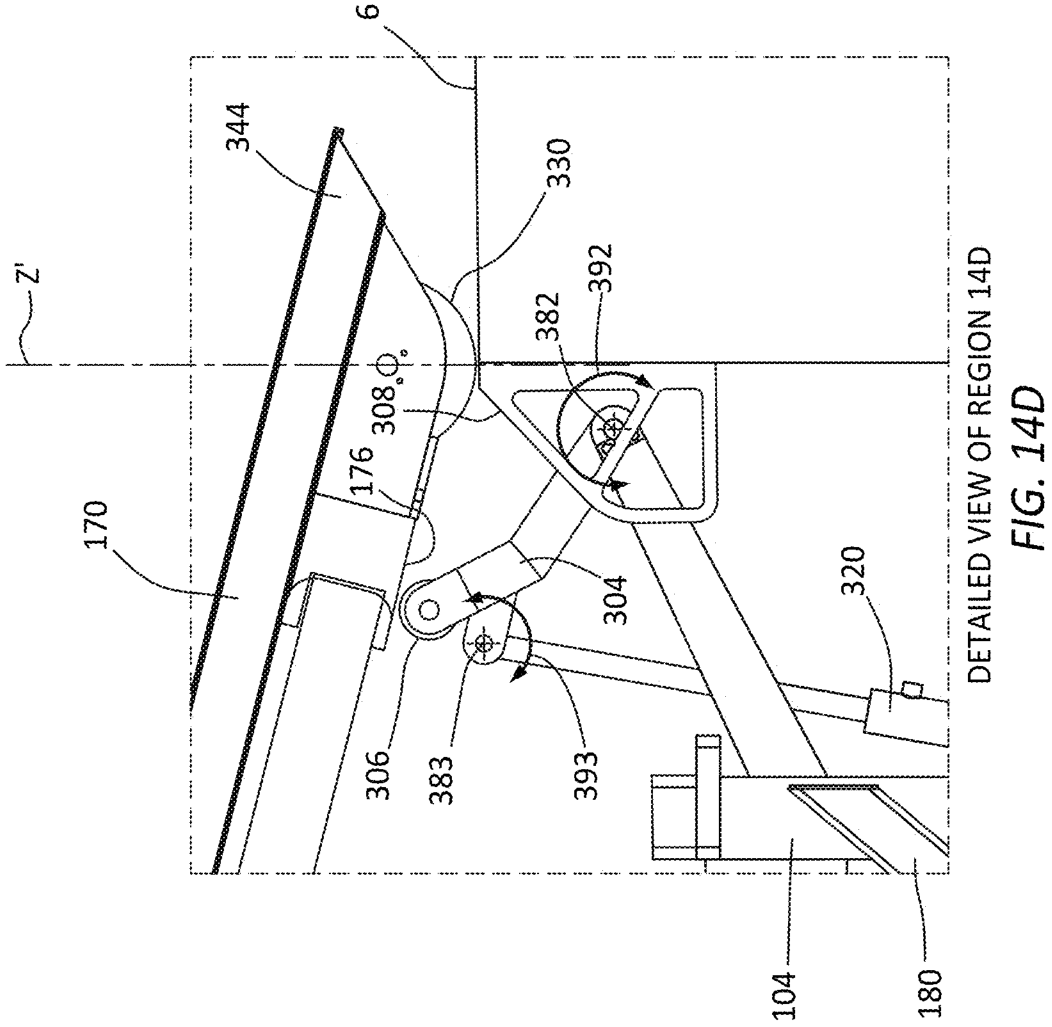
FIG. 14D is a detailed view of a region 14D indicated in FIG. 14C, in certain embodiments.

Referring to FIG. 14D, this is a detailed view of the region 14D indicated in the FIG. 14C. As the right side 344 is lifted from the cavity, the bias arm 304 rotates (arrows 392) about the pivot axis 382, and the bias arm 304 rotates (arrows 393) about the pivot axis 383. The roller 306 can engage the bottom surface 176 to assist in raising the right side 344 while allowing movement along the bottom surface 176 relative to the bias arm 304. Also, the wheel 330 has reached the top of the inclined surface 308, the rotational axis of the wheel 330 can be positioned in a vertical direction Z' above the edge of the surface 6, indicating that the wheel is starting to roll along the surface 6.

Figure 14E:
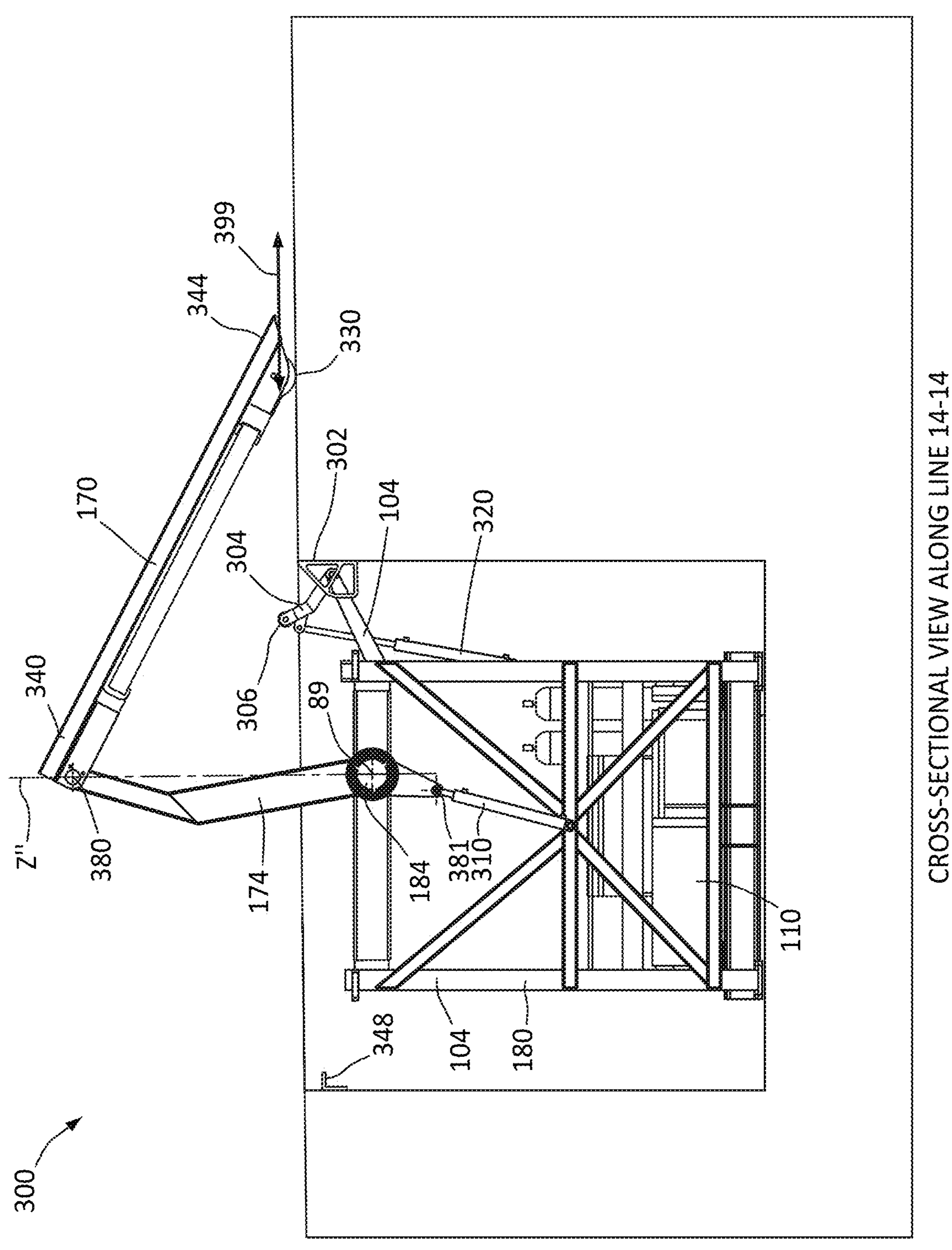

Referring to FIG. 14E, the lift arm 174 has been rotated clockwise until the weight of the cover 170 that is acting on the lift arm 174 via the pivot axis 380 is positioned in a vertical direction Z" above the pivot axis 89 of the motor 184. At this stage of deployment, the second lever arm 179 is at a radial orientation relative to the pivot axis 89 that the vector of the pulling force of the gas spring 310 is aligned with the pivot axis 381 and the pivot axis 89. Therefore, the gas spring is supplying substantially "0" zero rotational force to the second lever arm 179. As can be seen, the bias arm 304 remains rotated upward to its max rotation angle and will stay in that orientation until the cover 170 is returned to the closed position and again exerts a downward force on the bias arm 304, which will then rotate downward. As the lift arm 174 continues to rotate in a clockwise direction, the wheel 330 will allow the right side 344 to move horizontally (arrows 399) along the surface 6.

Figure 14F:
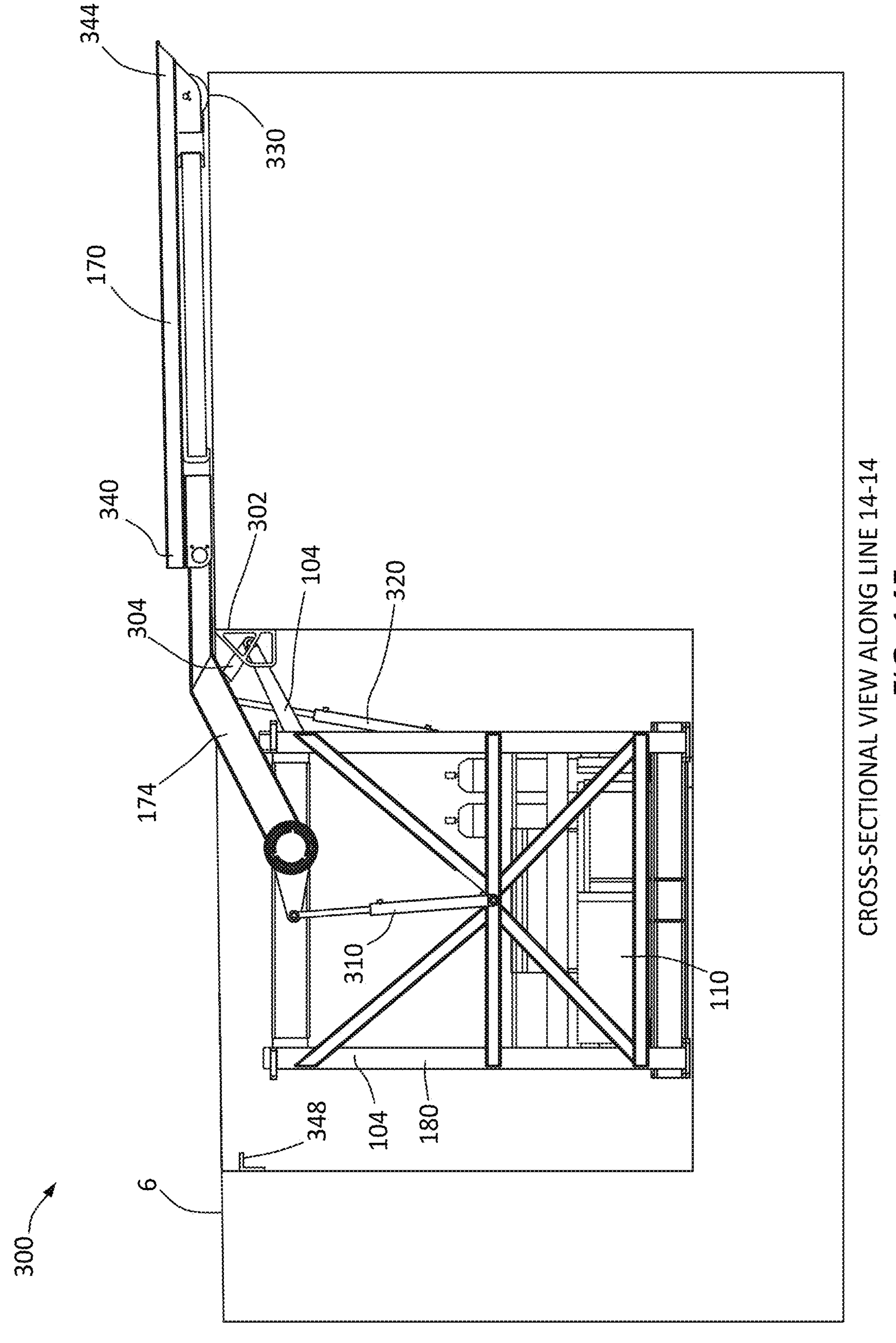

Referring now to FIG. 14F, the lift arm 174 has been rotated in a clockwise direction to its maximum rotation moving the wheel 330 to its maximum extended position and both the left side 340 and the right side 344 can be resting on the surface 6. At this stage of deployment, the cover 170 is in its fully open position. Please note that the gas spring 310 is now applying a pulling force to the second lever arm 179, but the pulling force is now urging the lift arm 174 to rotate in a counterclockwise direction. This is beneficial when the motor 184 needs to move the cover from the fully open position toward the fully closed position. The gas spring 310 again applies a counterbalance force to the second lever arm 179, but in an opposite direction.

Figure 15A:
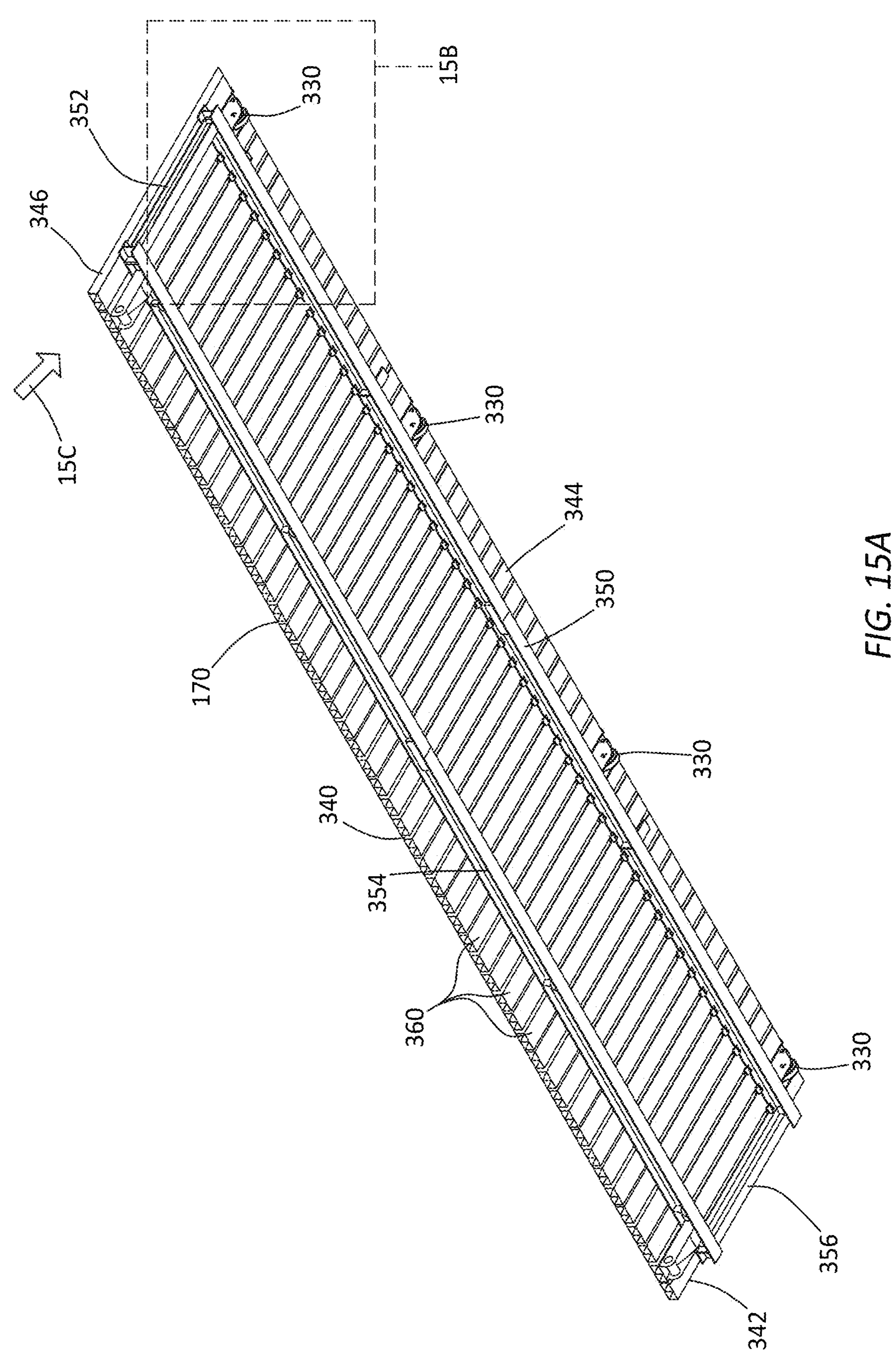
FIG. 15A is a perspective view of a bottom of a moveable cover without the support structure shown for discussion purposes, in certain embodiments.

FIG. 15A is a perspective view of a bottom of a moveable cover 170 without the support structure 104 shown for illustration purposes, in certain embodiments. In a non-limiting embodiment, the cover 170 can include a set of support beams 350, 352, 354, 356 that can form a rectangular assembly for supporting a floor structure for the cover 170. Multiple support panels 360 can be interlocked with each other to form the floor structure for the cover 170 and secured to the rectangular assembly of the support beams 350, 352, 354, 356 to form the cover 170. The support panels can be panels similar to floor panels used to build a deck for a helicopter on an offshore oil drilling rig. In a non-limiting embodiment, the cover 170 can include four wheels 330, which would correspond to four inclined brackets 302 of the support structure 104.

Figure 15B:
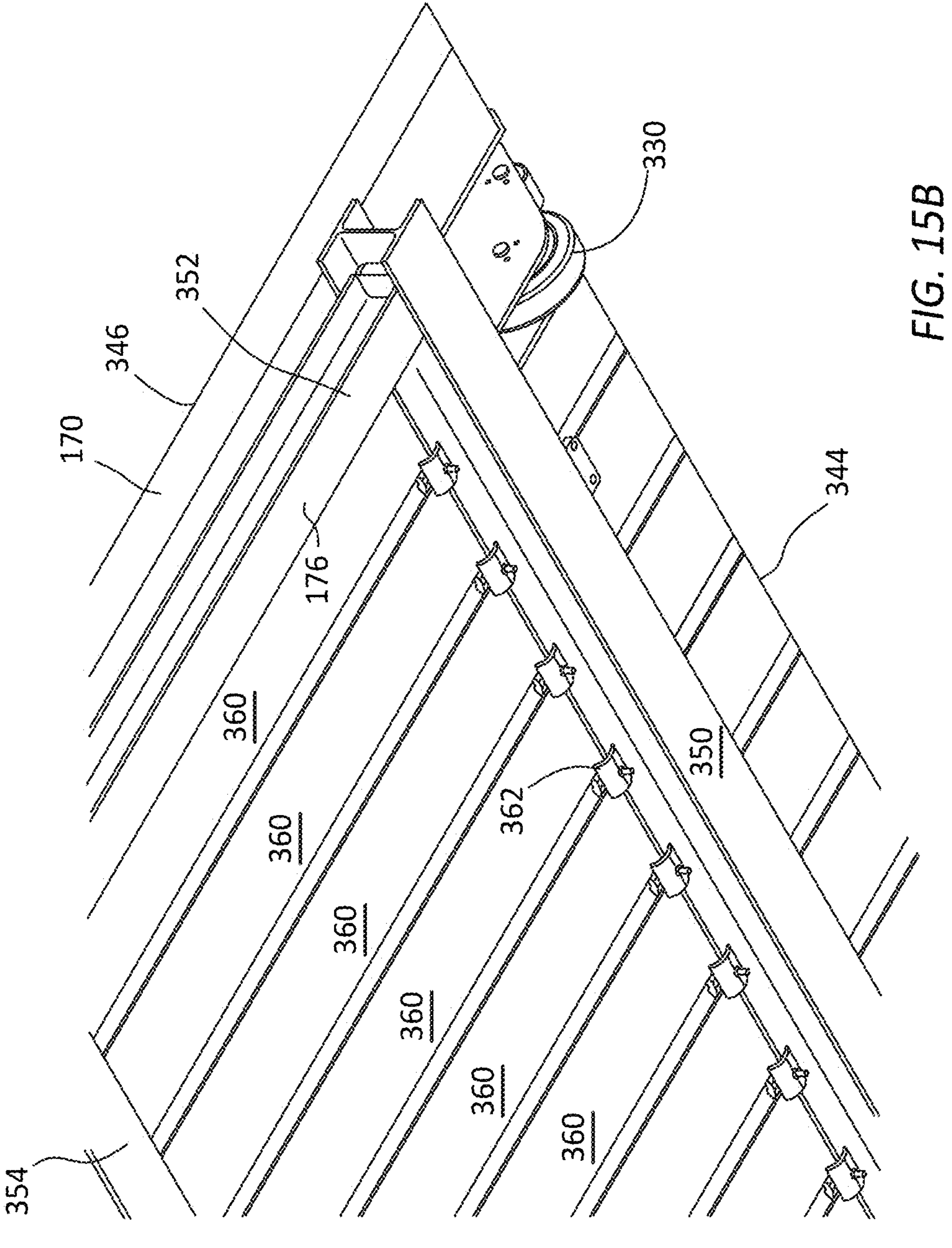
FIG. 15B is a detailed view of a region 15B indicated in FIG. 15A, in certain embodiments.

FIG. 15B is a detailed view of a region 15B indicated in FIG. 15A. Fasteners 362 can be used to secure the support panels 360 to the rectangular assembly. The bottom surface 176 can be the surface along with the roller 306 is engaged during opening or closing the cover 170.

Figure 15C:
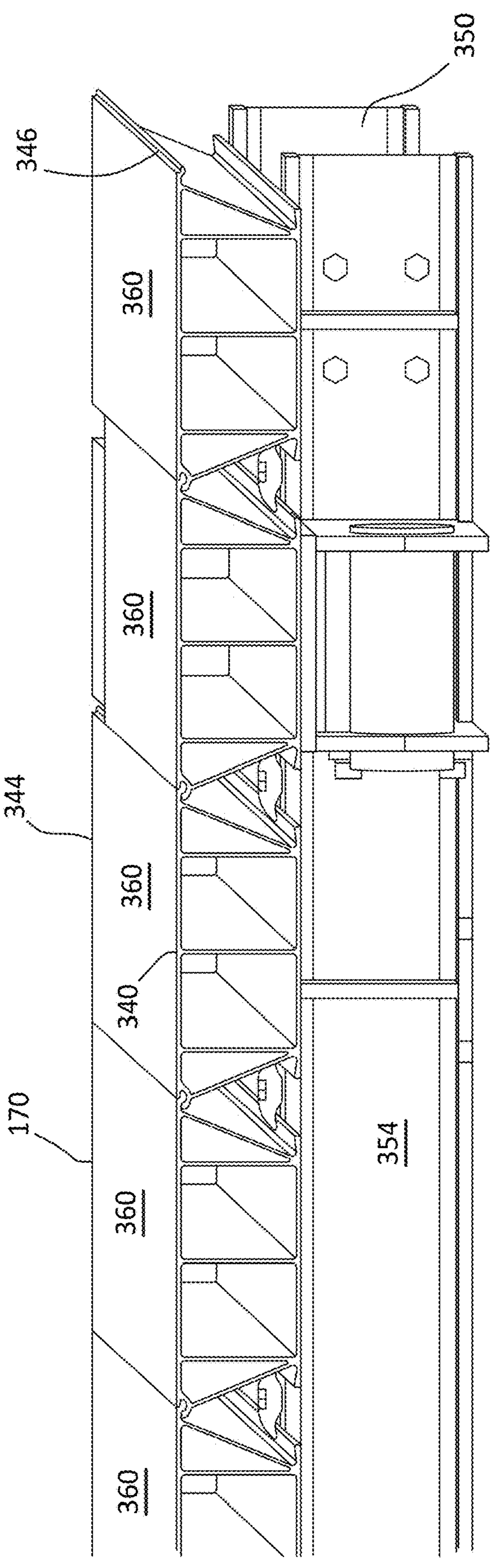
FIG. 15C is a detailed perspective side view from the perspective indicated by the arrow 15C in FIG. 15A.

FIG. 15C is a detailed perspective side view from the perspective indicated by the arrow 15C in FIG. 15A. The support panels 360 are shown to have a generally hollow cross-section with multiple support ribs for strength. However, other support panels 360 can be used.

VARIOUS EMBODIMENTS

Embodiment 1. A system for performing ground operations on a vehicle, the system comprising:

- a cavity extending below a surface on which the vehicle is transported, the cavity comprising a support structure with a frame; and
- a robotic arm that rotates from a stowed position within the cavity to a deployed position, wherein at least a portion of the robotic arm extends from the cavity in the deployed position.

Embodiment 2. The system of embodiment 1, further comprising a tool coupled to the robotic arm, wherein the tool is positioned within the cavity when the robotic arm is in the stowed position and the tool is positioned outside of the cavity when the robotic arm is in the deployed position.

Embodiment 3. The system of embodiment 2, wherein the tool supports performance of a ground operation on the vehicle when the robotic arm is in the deployed position.

Embodiment 4. The system of embodiment 3, wherein the ground operation is de-icing, washing, engine washing, inspection, or a combination thereof.

Embodiment 5. The system of embodiment 3, wherein the vehicle comprises an aircraft, a space vehicle, a boat, a ship, a bus, a truck, an 18-wheeler transport, a train car, a train engine, a trolley car, or a car.

Embodiment 6. The system of embodiment 1, wherein the robotic arm further comprises a base that rotates about a substantially vertical first pivot axis, and wherein the base is coupled to the frame.

Embodiment 7. The system of embodiment 6, wherein the robotic arm further comprises a lower segment rotationally coupled to the base at a substantially horizontal second pivot axis.

Embodiment 8. The system of embodiment 7, wherein the robotic arm further comprises an upper segment rotationally coupled to the lower segment at a substantially horizontal third pivot axis.

Embodiment 9. The system of embodiment 8, wherein the robotic arm further comprises a wrist joint rotationally coupled to the upper segment at a fourth pivot axis.

Embodiment 10. The system of embodiment 9, wherein the wrist joint comprises a tool interface that rotates about a fifth pivot axis, and wherein the wrist joint articulates to move the tool interface to an orientation such that the fifth pivot axis is angled relative to the fourth pivot axis at an angle that ranges from "0" degrees to 140 degrees.

Embodiment 11. The system of embodiment 10, wherein the wrist joint articulates to move the tool interface to an orientation such that the fifth pivot axis is angled relative to the fourth pivot axis at an angle that ranges from "0" degrees to 120 degrees.

Embodiment 12. The system of embodiment 10, wherein a plurality of tools are configured to couple to the tool interface, wherein one of the plurality of tools is coupled to the tool interface, and wherein rotation of the tool interface about the fifth pivot axis rotates the one of the plurality of tools about the fifth pivot axis.

Embodiment 13. The system of embodiment 10, wherein a plurality of hoses are routed through the base, the lower segment, the upper segment, and the wrist joint to couple the one of a plurality of tools to high pressure fluid, to power, and to control and data cables.

Embodiment 14. The system of embodiment 6, wherein the frame comprises tracks and the base is coupled to the tracks, and wherein the base is configured to translate substantially horizontally along the track and thereby translate the robotic arm along the tracks.

Embodiment 15. The system of embodiment 1, wherein the robotic arm comprises one or more sensors coupled proximate an end of the robotic arm.

Embodiment 16. The system of embodiment 15, wherein the robotic arm comprises a wrist joint rotationally coupled to an upper segment, wherein a tool is coupled to the wrist joint, and wherein the one or more sensors are coupled to the tool, the wrist joint of the robotic arm, an upper end of the upper segment, or combinations thereof.

Embodiment 17. The system of embodiment 16, wherein the robotic arm manipulates the one or more sensors to a location that is proximate each one of a plurality of reference locations on the vehicle.

Embodiment 18. The system of embodiment 17, further comprising a control system is configured to:

receive sensor data from the one or more sensors;

receive encoder data from one or more encoders of the robotic arm;

determine an orientation of each one of the plurality of reference locations relative to the one or more sensors based on the sensor data;

determine a distance from the one or more sensors to each one of the plurality of reference locations; and position a three-dimensional (3D) model of the vehicle in a virtual 3D space based on the distance and the orientation of each one of the plurality of reference locations.

Embodiment 19. The system of embodiment 18, wherein the control system is configured to control the robotic arm based on the 3D model in the virtual 3D space.

Embodiment 20. A method for performing ground operations on a vehicle, the method comprising:

forming a cavity that extends below a surface on which a vehicle is transported;

disposing a support structure in the cavity;

coupling a robotic arm to the support structure; and rotating the robotic arm from a stowed position within the cavity to a deployed position, where at least a portion of the robotic arm extends from the cavity in the deployed position.

Embodiment 21. The method of embodiment 20, further comprising coupling a tool to the robotic arm, wherein the tool is positioned within the cavity when the robotic arm is in the stowed position and the tool is positioned outside of the cavity when the robotic arm is in the deployed position.

Embodiment 22. The method of embodiment 21, further comprising:

performing a ground operation on the vehicle by manipulating the tool, via the robotic arm, proximate a surface of the vehicle;

moving the tool along the surface while maintaining a desired distance from the surface; and performing the ground operation on the surface while moving the tool along the surface.

Embodiment 23. The method of embodiment 22, wherein the ground operation is de-icing, washing, engine washing, inspection, or a combination thereof.

Embodiment 24. The method of embodiment 23, wherein the vehicle comprises an aircraft, a space vehicle, a boat, a ship, a bus, a truck, an 18-wheeler transport, a train car, a train engine, a trolley car, or a car.

Embodiment 25. The method of embodiment 20, further comprising:

rotationally coupling a lower segment of the robotic arm to a base of the robotic arm at a substantially horizontal second pivot axis, with the base configured to rotate the robotic arm about a substantially vertical first pivot axis;

rotationally coupling an upper segment of the robotic arm to the lower segment at a substantially horizontal third pivot axis;

rotationally coupling a wrist joint of the robotic arm to the upper segment at a fourth pivot axis; and coupling a tool to a tool interface of the wrist joint; and rotating the tool and the tool interface about a fifth pivot axis.

Embodiment 26. The method of embodiment 25, further comprising articulating the wrist joint to move the tool interface, such that the fifth pivot axis is moved to an angle relative to the fourth pivot axis that is in a range from "0" degrees to 140 degrees.

Embodiment 27. The method of embodiment 26, further comprising articulating the wrist joint to move the tool interface, such that the fifth pivot axis is moved to an angle relative to the fourth pivot axis that is in a range from "0" degrees to 120 degrees.

Embodiment 28. The method of embodiment 26, further comprising:

coupling one of a plurality of tools to the tool interface;

performing a ground operation on the vehicle;

removing the one of the plurality of tools from the tool interface;

coupling another one of the plurality of tools to the tool interface; and performing a different ground operation.

Embodiment 29. The method of embodiment 20, wherein the support structure comprises tracks, the method further comprising translating the robotic arm horizontally along the tracks.

Embodiment 30. The method of embodiment 20, further comprising:

coupling one or more sensors proximate an end of the robotic arm; and manipulating, via the robotic arm, the one or more sensors to a location that is proximate each one of a plurality of reference locations on the vehicle.

Embodiment 31. The method of embodiment 30, further comprising:

receiving sensor data, at a control system, from the one or more sensors;

receiving encoder data, at a control system, from one or more encoders coupled to the robotic arm;

determining an orientation of each one of the plurality of reference locations relative to the one or more sensors based on the sensor data;

determining a distance from the one or more sensors to each one of the plurality of reference locations; and establishing an orientation and position of a three-dimensional (3D) model of the vehicle in a virtual 3D space based on the distance and the orientation of each one of the plurality of reference locations.

Embodiment 32. The method of embodiment 31, further comprising manipulating the robotic arm based on the 3D model in the virtual 3D space to perform a ground operation on the vehicle.

Embodiment 33. A system for performing ground operations on a vehicle, the system comprising:

a support structure mounted to a surface, the support structure comprising a track; and a robotic arm comprising a base, a lower segment, and an upper segment, wherein the base is coupled to the track and configured to translate horizontally along the track and rotate the robotic arm about a vertical pivot axis, wherein the lower segment is rotationally coupled to the base and the upper segment is rotationally coupled to the lower segment, and wherein the robotic arm rotates from a stowed position to a deployed position when the lower segment rotates upward relative to the base.

Embodiment 34. The system of embodiment 33, further comprising a wrist joint coupled to the upper segment; and a tool coupled to a tool interface of the wrist joint.

Embodiment 35. The system of embodiment 34, wherein the robotic arm is manipulated to move the tool along a surface of the vehicle, while the tool is spaced away from the surface by a predetermined distance; and the tool configured to perform a ground operation on the surface as the tool is moved along the surface.

Embodiment 36. A method for performing ground operations on a vehicle, the method comprising:

mounting a robotic arm to a support structure, wherein the support structure comprises a track;

coupling a base of the robotic arm to the track;

horizontally translating the robotic arm along the track; and deploying the robotic arm from a stowed position to a deployed position by rotating the robotic arm upward from the stowed position.

Embodiment 37. The method of embodiment 36, further comprising:

rotationally coupling a tool to the robotic arm;

manipulating the tool, via the robotic arm, to move the tool along a surface of the vehicle, while the tool is spaced away from the surface by a predetermined distance; and performing a ground operation on the surface as the tool is moved along the surface.

Embodiment 38. A system for performing ground operations on a vehicle, the system comprising:

a cavity extending below a surface on which the vehicle is to be transported; and a robotic arm that is configured to rotate from a stowed position within the cavity to a deployed position, wherein at least a portion of the robotic arm extends from the cavity in the deployed position.

Embodiment 39. The system of embodiment 38, further comprising a tool coupled to the robotic arm, wherein the tool is positioned within the cavity when the robotic arm is in the stowed position and the tool is positioned outside of the cavity when the robotic arm is in the deployed position, and wherein the tool supports performance of a ground operation on the vehicle when the robotic arm is in the deployed position.

Embodiment 40. A method for performing ground operations on a vehicle, the method comprising:

forming a cavity that extends below a surface on which a vehicle is to be transported; and rotating a robotic arm from a stowed position within the cavity to a deployed position, wherein at least a portion of the robotic arm extends from the cavity in the deployed position.

Embodiment 41. The method of embodiment 40, further comprising:

performing a ground operation on the vehicle by manipulating a tool, via the robotic arm, proximate a surface of the vehicle;

moving the tool along the surface while maintaining a desired distance from the surface; and performing the ground operation on the surface while moving the tool along the surface.

Embodiment 42. A system for performing ground operations on a vehicle, the system comprising:

a support structure disposed within a cavity extending below a surface on which the vehicle is to be transported, the support structure comprising a track; and a robotic arm rotationally coupled to a base, wherein the base is coupled to the track and configured to translate horizontally along the track, and wherein the robotic arm deploys from the cavity to perform the ground operations.

Embodiment 43. The system of embodiment 42, further comprising a tool coupled to the robotic arm, wherein the tool is positioned within the cavity when the robotic arm is in a stowed position and the tool is positioned outside of the cavity when the robotic arm is in a deployed position, and wherein the tool supports performance of a ground operation on the vehicle when the robotic arm is in the deployed position.

Embodiment 44. The method or system of any one of embodiments 1 thru 43, further comprising a cover configured to selectively permit deployment of the robotic arm from the cavity.

Embodiment 45. A system that performs ground operations for a vehicle, the system comprising:

a robotic arm with a wrist joint rotationally coupled at one end, wherein the wrist joint manipulates a tool during a ground operation for the vehicle, the wrist joint comprising:

a first end coupled to the robotic arm;

a second end coupled to the tool; and a tool motor coupled to the second end and configured to rotate the tool relative to the wrist joint about a tool axis, wherein the tool motor rotates with the tool about the tool axis.

Embodiment 46. The system of embodiment 45, further comprising a plurality of hoses and a center hose extending through an interior space of the wrist joint from the first end to the second end, with the plurality of hoses helically wrapped around the center hose.

Embodiment 47. The system of embodiment 46, further comprising a hose motor coupled to the first end of the wrist joint and configured to rotate the plurality of hoses and the center hose about a hose axis at the first end, wherein the plurality of hoses and the center hose rotate about the hose axis relative to the robotic arm.

Embodiment 48. The system of embodiment 47, wherein the tool motor is configured to rotate the plurality of hoses and the center hose about the tool axis at the second end.

Embodiment 49. The system of embodiment 48, wherein the hose motor and the tool motor cooperate with each other to rotate the plurality of hoses and the center hose relative to the robotic arm as the tool is rotated by the tool motor, regardless of a relative angle between the tool axis and the hose axis.

Embodiment 50. The system of embodiment 49, wherein the wrist joint comprises multiple wedged segments with each adjacent wedged segment being rotationally coupled to each other, and wherein the wrist joint rotates the multiple wedged segments and angles the tool axis relative to the hose axis to an angle in a range from "0" zero degrees to 140 degrees.

Embodiment 51. The system of embodiment 49, wherein the wrist joint comprises multiple wedged segments with each adjacent wedged segment being rotationally coupled to each other, and wherein the wrist joint rotates the multiple wedged segments and angles the tool axis relative to the hose axis to an angle in a range from "0" zero degrees to 120 degrees.

Embodiment 52. The system of embodiment 51, wherein the wrist joint further comprises a first drive gear and a second drive gear positioned at the first end of the wrist joint, and wherein independent rotation of the first drive gear and the second drive gear rotates the multiple wedge segments to change the angle of the tool axis relative to the hose axis.

Embodiment 53. The system of embodiment 52, wherein the vehicle comprises an aircraft, a space vehicle, a boat, a ship, a bus, a truck, an 18-wheeler transport, a train car, a train engine, a trolley car, or a car.

Embodiment 54. A method for performing operations on a vehicle, the method comprising:

rotationally coupling one end of a wrist joint to an end of a robotic arm;

coupling a tool to an opposite end of the wrist joint;

manipulating the tool via the wrist joint and the robotic arm during a ground operation for the vehicle;

rotating, via a tool motor, the tool relative to the wrist joint about a tool axis; and rotating the tool motor with the tool about the tool axis.

Embodiment 55. The method of embodiment 54, further comprising:

extending a plurality of hoses and a center hose through an interior space of the wrist joint from a first end of the wrist joint to a second end of the wrist joint; and helically wrapping the plurality of hoses around the center hose.

Embodiment 56. The method of embodiment 55, further comprising:

coupling a hose motor to an upper segment of the robotic arm;

rotating the plurality of hoses and the center hose around a hose axis by operating the hose motor; and rotating the plurality of hoses and the center hose relative to the upper segment.

Embodiment 57. The method of embodiment 56, further comprising:

coupling a tool motor at the second end of the wrist joint; and rotating, with the tool, the plurality of hoses and the center hose around a tool axis at the second end by operating the hose motor.

Embodiment 58. The method of embodiment 57, further comprising:

rotating the hose motor in cooperation with the tool motor to rotate the plurality of hoses and the center hose relative to the robotic arm as the tool is rotated by the tool motor, regardless of a relative angle between the tool axis and the hose axis.

Embodiment 59. The method of embodiment 58, further comprising angling the tool axis relative to the hose axis by rotating multiple wedge segments of the wrist joint relative to each other, thereby angling tool axis relative to the hose axis to an angle in a range from "0" zero degrees to 140 degrees.

Embodiment 60. The method of embodiment 59, further comprising angling the tool axis relative to the hose axis to an angle in a range from "0" zero degrees to 120 degrees.

Embodiment 61. The method of embodiment 60, further comprising rotating the multiple wedge segments of the wrist joint relative to each other by independently rotating a first drive gear and a second drive gear positioned at the first end of the wrist joint.

Embodiment 62. The method of embodiment 61, wherein the vehicle comprises an aircraft, a space vehicle, a boat, a ship, a bus, a truck, an 18-wheeler transport, a train car, a train engine, a trolley car, or a car.

Embodiment 63. A wrist joint for a robotic arm that performs operations on an aircraft, the wrist joint comprising:

a wrist joint with a first end coupled to a robotic arm and a second end coupled to a tool, wherein the wrist joint provides for manipulating the tool during an operation for an aircraft;

a plurality of hoses and a center hose extending through an interior space of the wrist joint from the first end to the second end, with the plurality of hoses helically wrapped around the center hose;

a hose motor coupled to the first end of the wrist joint and configured to rotate the plurality of hoses and the center hose about a first axis at the first end; and a tool motor coupled to the second end and configured to rotate the plurality of hoses and the center hose about a second axis at the second end, wherein the hose motor and the tool motor cooperate with each other to rotate the plurality of hoses and the center hose as the tool is rotated by the tool motor, regardless of a relative angle between the first axis and the second axis.

Embodiment 64. The wrist joint of embodiment 63, wherein the hose motor and the tool motor cooperate with each other to rotate the plurality of hoses and the center hose as the tool is rotated by the tool motor, regardless of a relative angle between the first axis and the second axis.

Embodiment 65. The method or system of any one of embodiments 45 thru 64, further comprising a cavity; and a cover, wherein the cover is configured to selectively control access to the cavity, and wherein the robotic arm is configured to be stowed in the cavity and deployed from the cavity to perform the ground operation on the vehicle.

Embodiment 66. A method for performing ground operations on a vehicle, the method comprising:

receiving a three-dimensional (3D) model of the vehicle at a control system, wherein the vehicle is positioned within a 3D ground operational space;

manipulating a robotic arm to position a sensor at a predetermined distance from a reference location of the vehicle;

measuring, via the sensor, a distance from the sensor to the reference location;

determining a relative position of the reference location based on a known relative position of the sensor in the 3D ground operational space and the measured distance;

establishing an orientation of the 3D model in a virtual 3D space based on the relative position of the reference location; and manipulating the robotic arm to perform a ground operation on the vehicle based on the position of the 3D model in the virtual 3D space.

Embodiment 67. The method of embodiment 66, further comprising:

manipulating the robotic arm to position a sensor at the predetermined distance from each of a plurality of reference locations of the vehicle;

measuring, via the sensor, a respective distance from the sensor to each of the reference location;

determining the relative position of each of the reference locations based on the known respective relative position of the sensor in the 3D ground operational space and the measured distance for each one of the reference locations;

establishing the position of the 3D model in the virtual 3D space based on the relative positions of the reference locations; and manipulating the robotic arm to perform a ground operation on the vehicle based on the position of the 3D model in the virtual 3D space.

Embodiment 68. The method of embodiment 66, further comprising:

performing the ground operation on a surface of the vehicle;

inspecting the surface; and determining a performance score of the ground operation on the surface.

Embodiment 69. The method of embodiment 68, repeating the ground operation on the surface if the performance score is below a desired value, or proceeding to a next step in the ground operation if the performance score is equal to or above the desired value.

Embodiment 70. The method of embodiment 68, wherein the performance score is automatically determined via the control system, and wherein the control system automatically proceeds to a next task based on the performance score.

Embodiment 71. The method of embodiment 66, wherein establishing the position of the 3D model comprises dividing a component of the vehicle into at least two portions, with the two portions being rotationally coupled in the 3D model to each other; and establishing a rotated position of one of the two portions relative to the other one of the two portions based on the measured distance.

Embodiment 72. The method of embodiment 66, dividing the vehicle into a plurality of work zones, with the plurality of work zones comprising a first work zone and a second work zone.

Embodiment 73. The method of embodiment 72, further comprising:

performing the ground operation on the first work zone;

inspecting a surface of the first work zone; and determining a performance score of the ground operation on the surface of the first work zone.

Embodiment 74. The method of embodiment 73, repeating the ground operation on the surface of the first work zone if the performance score is below a desired value, or proceeding to the second work zone on which to perform the ground operation if the performance score is equal to or above the desired value.

Embodiment 75. The method of embodiment 73, wherein the performance score is automatically determined via the control system, and wherein the control system automatically proceeds to the second work zone based on the performance score.

Embodiment 76. The method of embodiment 73, wherein performing the ground operation on the vehicle further comprises:

coupling a tool to an end of the robotic arm;

controlling the robotic arm, via the control system, to locate the tool at a desired distance away from the surface of the first work zone; and controlling the robotic arm, via the control system, to move the tool along the surface of the first work zone while substantially maintaining the desired distance away from the surface of the first work zone.

Embodiment 77. The method of embodiment 76, further comprising:

proceeding to the second work zone to perform the ground operation on a surface of the second work zone;

controlling the robotic arm, via the control system, to position the tool at the desired distance away from the surface of the second work zone; and controlling the robotic arm, via the control system, to move the tool along the surface of the second work zone while substantially maintaining the desired distance away from the surface of the second work zone.

Embodiment 78. The method of embodiment 77, further comprising:

proceeding to a next work zone in the plurality of work zones to perform the ground operation on a surface of the next work zone;

controlling the robotic arm, via the control system, to position the tool at the desired distance away from the surface of the next work zone; and controlling the robotic arm, via the control system, to move the tool along the surface of the second work zone while substantially maintaining the desired distance away from the surface of the next work zone;

repeating the proceeding to the next work zone and the controlling the robotic arm to perform the ground operation on each of the plurality of work zones; and completing the ground operation on the vehicle.

Embodiment 79. The method of embodiment 72, wherein the robotic arm comprises a plurality of robotic arms, the method further comprising manipulating the plurality of robotic arms to perform the ground operation on the plurality of work zones, wherein a subset of the plurality of the work zones is allocated to each of the plurality of robotic arms with each of the subsets including different ones of the plurality of work zones, and wherein the control system manipulates the plurality of robotic arms to perform the ground operation on the respective subset allocated to each one of the plurality of robotic arms.

Embodiment 80. The method of embodiment 66, wherein the reference location comprises a plurality of reference locations of the vehicle, wherein the robotic arm comprises a first robotic arm with a first sensor coupled to the first robotic arm and a second robotic arm with a second sensor coupled to the second robotic arm.

Embodiment 81. The method of embodiment 80, wherein manipulating the robotic arm further comprises manipulating the first robotic arm to sequentially position the first sensor proximate each reference location of a first subset of the plurality of reference locations and manipulating the second robotic arm to sequentially position the second sensor proximate each reference location of a second subset of the plurality of reference locations.

Embodiment 82. The method of embodiment 81, further comprising determining a relative position of each one of the reference locations in the first subset of reference locations based on a known relative position of the first sensor in the 3D ground operational space and the measured distance at each one of the reference locations in the first subset.

Embodiment 83. The method of embodiment 82, further comprising determining a relative position of each one of the reference locations in the second subset of reference locations based on a known relative position of the second sensor in the 3D ground operational space and the measured distance at each one of the reference locations in the second subset.

Embodiment 84. The method of embodiment 83, further comprising:
- establishing a first orientation of the 3D model in the virtual 3D space based on the relative positions of the first subset of reference locations;
- establishing a second orientation of the 3D model in the virtual 3D space based on the relative positions of the second subset of reference locations; and
- comparing the first orientation with the second orientation.

Embodiment 85. The method of embodiment 84, further comprising:
- determining a difference between the first orientation and the second orientation based on the comparing; and
- determining an error in either the first orientation or the second orientation based on the difference.

Embodiment 86. The method of embodiment 85, wherein one or more reference locations in the first subset of reference locations are equal to one or more reference locations in the second subset of reference locations.

Embodiment 87. The method of embodiment 80, further comprising determining, via the control system, a potential collision of either the first robotic arm or the second robotic arm.

Embodiment 88. The method of embodiment 87, wherein the potential collision is determined based on sensor data received from a third sensor coupled to the first robotic arm or based on sensor data received from a fourth sensor coupled to the second robotic arm, or a combination thereof.

Embodiment 89. The method of embodiment 87, wherein the potential collision is a potential collision with a surface of the vehicle, with the first robotic arm, with the second robotic arm, or a combination thereof.

Embodiment 90. The method of embodiment 87, further comprising:
- establishing a bounding volume that extends past surfaces of the 3D model in the virtual 3D space, wherein the potential collision is determined when a portion of a digital twin of the first robotic arm or a portion a digital twin of the second robotic arm enters the bounding volume in the virtual 3D space according to the control system.

Embodiment 91. The method of embodiment 66, further comprising:
- determining one or more keep out zones on the vehicle; and
- controlling the robotic arm to avoid the one or more keep out zones, thereby preventing robotic arm from performing the ground operation on the one or more keep out zones.

Embodiment 92. The method of embodiment 66, wherein the sensor comprises a light detection and ranging (LiDAR) sensor, a radar sensor, a laser sensor, an acoustic sensor, a ranging sensor, a camera, or a combination thereof.

Embodiment 93. The method of embodiment 66, wherein the vehicle comprises an aircraft, a space vehicle, a boat, a ship, a bus, a truck, an 18-wheeler transport, a train car, a train engine, a trolley car, or a car.

Embodiment 94. A system for performing ground operations on a vehicle, the system comprising:
- a robotic arm;
- one or more sensors coupled to the robotic arm; and
- a control system configured to:
  - receive a three-dimensional (3D) model of a vehicle;
  - manipulate the robotic arm to position the one or more sensors within a predetermined distance from a respective one of one or more reference locations of the vehicle, wherein the vehicle is positioned within a 3D ground operational space;
  - measure, via the one or more sensors, a distance from the one or more sensors to each of one or more reference locations;
  - determine a relative position of each of the one or more reference locations in the 3D ground operational space based on a known relative position of each of the one or more sensors in the 3D ground operational space and the respective measured distances; and
  - establish an orientation of the 3D model based on the relative position of each of the one or more reference locations in the 3D ground operational space.

Embodiment 95. The system of embodiment 94, wherein the control system is further configured to manipulate the robotic arm to perform a ground operation on the vehicle based on the orientation of the 3D model in a virtual 3D space of the control system.

Embodiment 96. The system of embodiment 94, wherein the control system is further configured to:
- manipulate the robotic arm to perform a ground operation on a surface of the vehicle based on the orientation of the 3D model in a virtual 3D space of the control system;
- inspect, via the one or more sensors, the surface; and
- determine a performance score of the robotic arm to perform the ground operation on the surface.

Embodiment 97. The method or system of any one of embodiments 66 thru 96, further comprising a cavity; and a cover, wherein the cover is configured to selectively control access to the cavity, and wherein the robotic arm is configured to be stowed in the cavity and deployed from the cavity to perform the ground operation on the vehicle.

Embodiment 98. A system for controlling access to a cavity recessed in the ground during ground operations, the system comprising:
- a cover; and
- a support structure comprising a frame disposed at least partially in the cavity, wherein the cover is rotationally coupled to the frame, wherein the cover is in a generally horizontal orientation and positioned above at least a portion of the frame when the cover is in a fully closed position, and wherein the support structure moves the cover from a fully open position to the fully closed position.

Embodiment 99. The system of embodiment 98, wherein the support structure is configured to move the cover from the fully open position to the fully closed position in less than 2 minutes, in less than one minute, or less than 45 seconds, or less than 30 seconds, or less than 15 seconds.

Embodiment 100. The system of embodiment 98, further comprising a robotic arm with a ground operation tool coupled to one end and the robotic arm rotationally coupled to the support structure.

Embodiment 101. The system of embodiment 100, wherein the robotic arm is rotated into a stowed position in the cavity before the cover is moved to the fully closed position.

Embodiment 102. The system of embodiment 101, wherein the cover is positioned above the robotic arm when in the fully closed position and prevents deployment of the robotic arm from the stowed position.

Embodiment 103. The system of embodiment 98, wherein the support structure operates to move the cover from the fully closed position to the fully open position in less than 2 minutes.

Embodiment 104. The system of embodiment 103, wherein the support structure operates to move the cover from the fully closed position to the fully open position in less than one minute, or less than 45 seconds, or less than 30 seconds, or less than 15 seconds.

Embodiment 105. The system of embodiment 98, further comprising a first lift arm and a second lift arm, wherein the first lift arm is rotationally coupled to the frame at a first pivot axis that is positioned in the first lift arm and spaced away from both a first end and a second end of the first lift arm.

Embodiment 106. The system of embodiment 105, wherein the first end of the first lift arm is rotationally coupled to a left side of the cover at a second pivot axis.

Embodiment 107. The system of embodiment 106, further comprising a first motor fixedly coupled to the frame and configured to rotate the first lift arm about the first pivot axis in either direction.

Embodiment 108. The system of embodiment 106, wherein rotation of the first lift arm about the first pivot axis moves the cover between the fully closed position and either a partially open position or the fully open position.

Embodiment 109. The system of embodiment 108, wherein the fully closed position locates the cover vertically and horizontally above the cavity.

Embodiment 110. The system of embodiment 108, wherein the fully open position locates the cover horizontally spaced away from the cavity.

Embodiment 111. The system of embodiment 105, further comprising a first gas spring rotationally coupled at one end to the frame and rotationally coupled at an opposite end to the second end of the first lift arm at a third pivot axis, wherein the first gas spring applies a rotational force to the second end that varies in intensity as the cover is rotated between the fully closed position and the fully open position.

Embodiment 112. The system of embodiment 111, wherein the first gas spring applies a rotational force to the second end of the first lift arm that urges the first lift arm to rotate about the first pivot axis in a first direction when the cover is in the fully closed position, wherein the first gas spring applies the rotational force to the second end of the first lift arm that urges the first lift arm to rotate about the first pivot axis in a second direction when the cover is in the fully open position, and wherein the first direction is opposite the second direction.

Embodiment 113. The system of embodiment 111, wherein the rotational force applied to the second end of the first lift arm acts as a counterbalance that opposes a weight applied to the first end of the first lift arm by the cover.

Embodiment 114. The system of embodiment 105, further comprising a second lift arm, wherein the second lift arm is rotationally coupled to the frame at the first pivot axis that is positioned in the second lift arm and spaced away from both a first end and a second end of the second lift arm.

Embodiment 115. The system of embodiment 114, wherein the first end of the first lift arm and the first end of the second lift arm are rotationally coupled to a left side of the cover at a second pivot axis.

Embodiment 116. The system of embodiment 115, further comprising:

- a first motor fixedly coupled to the frame and configured to rotate the first lift arm about the first pivot axis in either direction; and
- a second motor fixedly coupled to the frame and configured to rotate the second lift arm about the first pivot axis in the either direction.

Embodiment 117. The system of embodiment 115, wherein rotation of the first lift arm and the second lift arm about the first pivot axis moves the cover between the fully closed position and either a partially open position or the fully open position.

Embodiment 118. The system of embodiment 117, wherein the fully closed position locates the cover vertically and horizontally above the cavity.

Embodiment 119. The system of embodiment 117, wherein the fully open position locates the cover horizontally spaced away from the cavity.

Embodiment 120. The system of embodiment 105, further comprising:

- a first gas spring rotationally coupled at one end to the frame and rotationally coupled at an opposite end to the second end of the first lift arm at a third pivot axis, wherein the first gas spring applies a rotational force to the second end of the first lift arm that varies in intensity as the cover is rotated between the fully closed position and the fully open position; and
- a second gas spring rotationally coupled at one end to the frame and rotationally coupled at an opposite end to the second end of the second lift arm at the third pivot axis, wherein the second gas spring applies a rotational force to the second end of the second lift arm that varies in intensity as the cover is rotated between the fully closed position and the fully open position.

Embodiment 121. The system of embodiment 120, wherein the first gas spring applies a rotational force to the second end of the first lift arm that urges the first lift arm to rotate about the first pivot axis in a first direction when the cover is in the fully closed position, wherein the first gas spring applies the rotational force to the second end of the first lift arm that urges the first lift arm to rotate about the first pivot axis in a second direction when the cover is in the fully open position, and wherein the first direction is opposite the second direction.

Embodiment 122. The system of embodiment 121, wherein the second gas spring applies a rotational force to the second end of the second lift arm that urges the second lift arm to rotate about the first pivot axis in the first direction when the cover is in the fully closed position, and wherein the second gas spring applies the rotational force to the second end of the second lift arm that urges the second lift arm to rotate about the first pivot axis in a second direction when the cover is in the fully open position.

Embodiment 123. The system of embodiment 122, wherein the rotational force applied to the second end of the first lift arm acts as a counterbalance that opposes a weight applied to the first end of the first lift arm by the cover, and wherein the rotational force applied to the second end of the second lift arm acts as a counterbalance that opposes a weight applied to the first end of the second lift arm by the cover.

Embodiment 124. A system for controlling access to a cavity recessed in the ground during ground operations, the system comprising:

a cover with a left side and a right side; and a support structure comprising:

a frame disposed at least partially in the cavity, a first lift arm rotationally coupled to the frame and rotationally coupled to the left side of the cover;

a first bias arm rotationally coupled to the frame; and a first gas spring rotationally coupled to the frame and rotationally coupled the first bias arm, wherein the first gas spring applies a first bias force to the first bias arm that urges the first bias arm to rotate upward into engagement with a first bottom surface of the cover, wherein the first bias arm urges the right side upward when the first lift arm rotates and lifts the left side of the cover upward.

Embodiment 125. The system of embodiment 124, further comprising:

a second lift arm rotationally coupled to the frame and rotationally coupled to the left side of the cover;

a second bias arm rotationally coupled to the frame; and a second gas spring rotationally coupled to the frame and rotationally coupled the second bias arm, wherein the second gas spring applies a second bias force to the second bias arm that urges the second bias arm to rotate upward into engagement with a second bottom surface of the cover, wherein the second bias arm urges the right side upward when the first lift arm rotates and lifts the left side of the cover upward.

Embodiment 126. The system of embodiment 124, wherein the cover further comprises a plurality of wheels rotationally coupled to the cover away from the left side and proximate the right side, wherein the plurality of wheels support a weight applied to the plurality of wheels by the right side of the cover while the plurality of wheels roll along a substantially horizontal surface.

Embodiment 127. The system of embodiment 126, wherein the one of the plurality of wheels roll along a respective one of a plurality of inclined brackets when the right side is raised from the cavity or lowered into the cavity.

Embodiment 128. A method for controlling access to a cavity recessed in the ground during ground operations, the method comprising:

stowing a robotic arm in a stowed position in the cavity;

rotating a cover to a fully open position away from the cavity allowing deployment of the robotic arm;

deploying the robotic arm by extending the robotic arm from the cavity; and returning the robotic arm to the stowed position in the cavity and rotating the cover from the fully open position to a fully closed position over the cavity.

Embodiment 129. The method of embodiment 128, further comprising returning the robotic arm to the stowed position in the cavity and rotating the cover from the fully open position to a fully closed position over the cavity in less than 2 minutes, in less than 1 minute, or less than 45 seconds, or less than 30 seconds, or less than 15 seconds.

Embodiment 130. The method or system of any one of embodiments 98 thru 129, further comprising a controller that is configured to control the robotic arm to perform the ground operation of the vehicle based on a three dimensional (3D) model oriented in a virtual 3D space, wherein the cover is configured to selectively control access to the cavity, and wherein the robotic arm is configured to be stowed in the cavity and deployed from the cavity to perform the ground operation on the vehicle.

Embodiment 131. A system for performing ground operations on a vehicle, the system comprising:

a robotic arm;

one or more sensors coupled to the robotic arm; and a control system configured to:

receive a three-dimensional (3D) model of a vehicle;

manipulate the robotic arm to position the one or more sensors within a predetermined distance from a respective one of one or more reference locations of the vehicle, wherein the vehicle is positioned within a 3D ground operational space;

measure, via the one or more sensors, a distance from the one or more sensors to each of one or more reference locations;

determine a relative position of each of the one or more reference locations in the 3D ground operational space based on a known relative position of each of the one or more sensors in the 3D ground operational space and the respective measured distances; and establish an orientation of the 3D model based on the relative position of each of the one or more reference locations in the 3D ground operational space.

Embodiment 132. The system of embodiment 131, wherein the control system is further configured to manipulate the robotic arm to perform a ground operation on the vehicle based on the orientation of the 3D model in a virtual 3D space of the control system.

Embodiment 133. The system of embodiment 131, wherein the control system is further configured to:

manipulate the robotic arm to perform a ground operation on a surface of the vehicle based on the orientation of the 3D model in a virtual 3D space of the control system;

inspect, via the one or more sensors, the surface; and determine a performance score of the robotic arm to perform the ground operation on the surface.

Embodiment 134. The system of embodiment 133, wherein the control system is further configured to repeat the ground operation on the surface if the performance score is below a desired value, or proceed to a next step in the ground operation if the performance score is equal to or above the desired value.

Embodiment 135. The system of embodiment 133, further comprising a tool coupled to an end of the robotic arm, wherein the control system is further configured to:

manipulate the robotic arm to locate the tool at a desired distance from the surface; and manipulate the robotic arm, based on the 3D model in a virtual 3D space, to maintain the desired distance between the tool and the surface as the tool is translated along the surface.

Embodiment 136. The system of embodiment 131, wherein the control system is further configured to:

determine one or more keep out zones on the vehicle based on the 3D model; and control the robotic arm to avoid the one or more keep out zones during the ground operation.

Embodiment 137. The system of embodiment 131, further comprising:

a cavity extending below a surface on which the vehicle is to be transported; and a robotic arm that is configured to rotate from a stowed position within the cavity to a deployed position, wherein at least a portion of the robotic arm extends from the cavity in the deployed position.

Embodiment 138. The system of embodiment 137, further comprising a tool coupled to the robotic arm, wherein the tool is positioned within the cavity when the robotic arm is in the stowed position and the tool is positioned outside of the cavity when the robotic arm is in the deployed position, and wherein the tool supports performance of a ground operation on the vehicle when the robotic arm is in the deployed position.

Embodiment 139. The system of embodiment 137, further comprising:

a support structure disposed within the cavity, the support structure comprising a track; and a base, to which the robotic arm is rotationally coupled, wherein the base is coupled to the track and configured to translate horizontally along the track.

Embodiment 140. The system of embodiment 131, further comprising:

a cavity extending below a surface on which the vehicle is to be transported;

a cover is configured to span the cavity in a fully closed position and to support at least a portion of a weight of the vehicle; and a support structure, wherein the cover is rotationally coupled to the support structure, and wherein the support structure is configured to move the cover between a generally horizontal orientation in a fully closed position and a generally horizontal orientation in a fully open position.

Embodiment 141. A system for performing ground operations on a vehicle, the system comprising:

a cavity extending below a surface on which the vehicle is to be transported; and a robotic arm that is configured to rotate from a stowed position within the cavity to a deployed position, wherein at least a portion of the robotic arm extends from the cavity in the deployed position.

Embodiment 142. The system of embodiment 141, further comprising a tool coupled to the robotic arm, wherein the tool is positioned within the cavity when the robotic arm is in the stowed position and the tool is positioned outside of the cavity when the robotic arm is in the deployed position, and wherein the tool supports performance of a ground operation on the vehicle when the robotic arm is in the deployed position.

Embodiment 143. A system for performing ground operations on a vehicle, the system comprising:

a support structure disposed within a cavity extending below a surface on which the vehicle is to be transported, the support structure comprising a track; and a robotic arm rotationally coupled to a base, wherein the base is coupled to the track and configured to translate horizontally along the track, and wherein the robotic arm deploys from the cavity to perform the ground operations.

Embodiment 144. A system for controlling access to a cavity recessed in the ground during ground operations on a vehicle, the system comprising:

a cover, in a fully closed position, is configured to span the cavity and to support at least a portion of a weight of the vehicle; and a support structure, wherein the cover is rotationally coupled to the support structure, and wherein the support structure is configured to move the cover between a generally horizontal orientation in a fully closed position and a generally horizontal orientation in a fully open position.

Embodiment 145. The system of embodiment 144, wherein the support structure is configured to move the cover from the fully open position to the fully closed position in less than 2 minutes.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A system for performing a ground operation on a vehicle, the system comprising:

a robotic arm which extends from a base that is disposed in a cavity below ground, wherein the robotic arm is rotationally coupled to the base, and wherein the robotic arm is configured to be stored within the cavity and deployed from the cavity for the ground operation;

one or more sensors coupled to the robotic arm; and a control system configured to:

receive a three-dimensional (3D) model of the vehicle;

manipulate the robotic arm to position the one or more sensors within a predetermined distance from a respective one of one or more reference locations of the vehicle, wherein the vehicle is positioned within a 3D ground operational space;

measure, via the one or more sensors, a distance from the one or more sensors to each of one or more reference locations;

determine a relative position of each of the one or more reference locations in the 3D ground operational space based on a known relative position of each of the one or more sensors in the 3D ground operational space and the respective measured distances; and establish an orientation of the 3D model based on the relative position of each of the one or more reference locations in the 3D ground operational space.

2. The system of claim 1, wherein the control system is further configured to manipulate the robotic arm to perform the ground operation on the vehicle based on the orientation of the 3D model in a virtual 3D space of the control system.

3. The system of claim 1, wherein the control system is further configured to:

manipulate the robotic arm to perform the ground operation on a surface of the vehicle based on the orientation of the 3D model in a virtual 3D space of the control system;

inspect, via the one or more sensors, the surface; and determine a performance score of the robotic arm to perform the ground operation on the surface.

4. The system of claim 3, wherein the control system is further configured to repeat the ground operation on the surface if the performance score is below a desired value, or proceed to a next step in the ground operation if the performance score is equal to or above the desired value.

5. The system of claim 3, further comprising a tool coupled to an end of the robotic arm, wherein the control system is further configured to:

manipulate the robotic arm to locate the tool at a desired distance from the surface; and manipulate the robotic arm, based on the 3D model in a virtual 3D space, to maintain the desired distance between the tool and the surface as the tool is translated along the surface.

6. The system of claim 1, wherein the control system is further configured to:

determine one or more keep out zones on the vehicle based on the 3D model; and control the robotic arm to avoid the one or more keep out zones during the ground operation.

7. The system of claim 1, further comprising:

the cavity extending below a surface on which the vehicle is to be transported, wherein the robotic arm is configured to rotate from a stowed position within the cavity to a deployed position, wherein at least a portion of the robotic arm extends from the cavity in the deployed position.

8. A method for performing a ground operation on a vehicle, the method comprising:

storing a robotic arm in a cavity below a surface on which the vehicle is to be transported;

extending the robotic arm from the cavity to perform the ground operation on the vehicle;

receiving a three-dimensional (3D) model of the vehicle at a control system, wherein the vehicle is positioned within a 3D ground operational space;

manipulating the robotic arm to position a sensor within a predetermined distance from a reference location of the vehicle;

measuring, via the sensor, a distance from the sensor to the reference location;

determining a relative position of the reference location based on a known relative position of the sensor in the 3D ground operational space and the measured distance; and establishing an orientation of the 3D model in a virtual 3D space based on the relative position of the reference location.

9. The method of claim 8, further comprising: manipulating the robotic arm to perform the ground operation on the vehicle in the 3D ground operational space based on the position of the 3D model in the virtual 3D space of the control system.

10. The method of claim 8, further comprising:

manipulating the robotic arm to position a sensor within the predetermined distance from each of a plurality of reference locations of the vehicle;

measuring, via the sensor, a respective distance from the sensor to each of the plurality of reference locations;

determining a relative position of each of the plurality of reference locations based on the known respective relative position of the sensor in the 3D ground operational space and the measured distance for each one of the plurality of reference locations; and establishing the position of the 3D model in the virtual 3D space based on the relative position of each of the plurality of reference locations.

11. The method of claim 10, further comprising: manipulating the robotic arm to perform the ground operation on the vehicle based on the position of the 3D model in the virtual 3D space.

12. The method of claim 8, further comprising:

performing the ground operation on a surface of the vehicle;

inspecting the surface; and determining a performance score of the ground operation on the surface.

13. The method of claim 12, repeating the ground operation on the surface if the performance score is below a desired value, or proceeding to a next step in the ground operation if the performance score is equal to or above the desired value.

14. The method of claim 12, wherein the performance score is automatically determined via the control system, and wherein the control system automatically proceeds to a next task based on the performance score.

15. The method of claim 8, wherein establishing the position of the 3D model comprises dividing a component of the vehicle into at least two portions, with the two portions being rotationally coupled in the 3D model to each other; and establishing a rotated position of one of the two portions relative to the other one of the two portions based on the measured distance.

16. The method of claim 8, dividing the vehicle into a plurality of work zones, with the plurality of work zones comprising a first work zone and a second work zone.

17. The method of claim 16, further comprising:

performing the ground operation on the first work zone;

inspecting a surface of the first work zone; and determining a performance score of the ground operation on the surface of the first work zone.

18. The method of claim 17, repeating the ground operation on the surface of the first work zone if the performance score is below a desired value, or proceeding to the second work zone on which to perform the ground operation if the performance score is equal to or above the desired value.

19. The method of claim 17, wherein the performance score is automatically determined via the control system, and wherein the control system automatically proceeds to the second work zone based on the performance score.

20. The method of claim 17, wherein performing the ground operation on the vehicle further comprises:

coupling a tool to an end of the robotic arm;

controlling the robotic arm, via the control system, to locate the tool at a desired distance away from the surface of the first work zone; and controlling the robotic arm, via the control system, to move the tool along the surface of the first work zone while substantially maintaining the desired distance away from the surface of the first work zone.

* * * * *